United States Patent
Innami et al.

[11] Patent Number: 5,834,732
[45] Date of Patent: Nov. 10, 1998

[54] APPARATUS FOR CONTROLLING CONSUMABLE ELECTRODE TYPE PULSED ARC WELDING POWER SOURCE

[75] Inventors: Tetsu Innami, Osaka; Wang Jingbo, Toyonaka; Hideki Ihara, Takarazuka, all of Japan

[73] Assignee: Matsushita Electric Industrial Co., Ltd., Osaka-Fu, Japan

[21] Appl. No.: 566,546

[22] Filed: Dec. 4, 1995

[30] Foreign Application Priority Data

Dec. 5, 1994 [JP] Japan ............................. 6-301074
Dec. 26, 1994 [JP] Japan ............................. 6-322498

[51] Int. Cl.$^6$ .................................................. B23K 9/09
[52] U.S. Cl. ............................. 219/130.51; 219/130.31
[58] Field of Search ................... 219/130.51, 130.21, 219/137 PS, 130.31, 130.32, 130.33

[56] References Cited

U.S. PATENT DOCUMENTS

| | | | |
|---|---|---|---|
| 4,201,906 | 5/1980 | Puschner | 219/130.33 |
| 4,301,355 | 11/1981 | Kimbrough et al. | 219/130.51 |
| 4,409,465 | 10/1983 | Yamamoto et al. | 219/130.51 |
| 4,427,874 | 1/1984 | Tabata et al. | 219/130.51 |
| 4,497,997 | 2/1985 | Bodewig | 219/130.51 |
| 4,758,707 | 7/1988 | Ogilvie et al. | 219/130.51 |

FOREIGN PATENT DOCUMENTS

| | | |
|---|---|---|
| A-0 570 678 | 11/1993 | European Pat. Off. . |
| 0 607 819 A1 | 7/1994 | European Pat. Off. . |
| 58-020377 | 2/1983 | Japan . |
| A-2 242 547 | 2/1991 | United Kingdom . |
| A-2 269 495 | 2/1994 | United Kingdom . |

OTHER PUBLICATIONS

*Welding International*, "The development of welding current control systems for spatter reduction", vol. 4, No. 5, Cambridge, Great Britain (1990).

*Primary Examiner*—Clifford C. Shaw
*Attorney, Agent, or Firm*—Panitch Schwarze Jacobs & Nadel, P.C.

[57] ABSTRACT

In a consumable electrode type pulsed arc welder using a $CO_2$ shielding gas a voltage detected by a detector (13) is given to a comparator (14) to which a reference voltage of a voltage setting circuit (15) is also inputted. When the detected voltage exceeds the reference voltage, a droplet detachment detection signal is issued. Then, an output adjusting circuit (16) lowers the welder output to a level $I_r$ lower than the ordinary current $I_p$.

14 Claims, 16 Drawing Sheets

APPARATUS FOR CONTROLLING CONSUMABLE ELECTRODE TYPE PULSED ARC WELDING POWER SOURCE

FIELD OF THE INVENTION

The present invention relates to an output control apparatus of a consumable electrode type pulsed arc welder which uses a shielding gas of carbon dioxide gas as its main composition.

DESCRIPTION OF THE PRIOR ART

Heretofore, for the consumable electrode type pulsed arc welding method, it has been known to use a shielding gas of an inert gas, e.g., argon gas as its main composition. In this method, a peak current larger than a value of critical current above which a spray transfer is possible and a base current lower than the critical current for maintaining an arc are fed or passed alternately at a frequency corresponding to a wire feeding speed. Thereby, the spray transfer can be made with a lower average current than DC welding method, and the droplet transfer is made during the period of base current in such a state that a least arc force act on the droplet. Consequently, spatter could be reduced largely.

However, the above-mentioned pulsed arc welding method has a restriction in choosing a shielding gas composition, because of the fact that, the spatter reducing effect becomes weak when the content ratio of carbon dioxide in a shielding gas exceeds 30%. Therefore, a large amount of argon gas is consumed, and accordingly the cost of the shielding gas has been a main cause of high running cost of the pulsed arc welding method.

And, as for the output controlling method of the consumable electrode type pulsed arc welding using a shielding gas of carbon dioxide as main composition, a constitution such as shown in Japanese Examined Patent Publication Hei 2-31630 (No.31630/1990) was a general type. Prior art of this publication was such that an arc was generated by passing the peak current and the base current alternately, letting a droplet detach by the pinch force at the initial stage of the peak current duration and subsequently form molten metal by melting the tip part of the electrode. Then the formed molten metal detaches during the next peak current duration.

However, in such power control scheme in the above-mentioned Japanese Examined Patent Publication Hei 2-31630, there was a danger of detached droplets as spatter, because the droplet having detached during the peak current duration is subject to a strong arc force due to the peak current.

The present invention purposes to prevent spatter generation, by performing the welding in a shielding gas including carbon dioxide gas as its main composition.

In order to attain the purpose, the spatter formation is prevented by lowering the power output responding to the detachment detection signal that is issued in synchronism with the droplet detachment.

OBJECT AND SUMMARY OF THE INVENTION

The output controller for a consumable electrode type pulsed arc welder in accordance with the present invention comprises a voltage detector for detecting the welding voltage, a comparator for performing a comparison arithmetic calculation between a detected voltage and a reference voltage from a voltage setting circuit to issue a detection signal when the detected voltage exceeds the reference voltage, and an output adjustor for reducing the welder output to a lower level lower than a peak current.

A further feature of the above-mentioned output controller for the consumable electrode type pulsed arc welder of the invention is that, besides the preceding feature, the comparator receives as inputs, an output signal from the initial voltage memory for memorizing a voltage value at the starting time of peak current conduction memorized by the signal from the voltage detector, a detected signal from the voltage detector, and a setting signal from the voltage setting circuit, and the comparator issues an output when a difference between the detected voltage from the voltage detector and the initial voltage from the initial voltage memory exceeds a set voltage set by the voltage setting circuit.

A further feature of the output controller for the consumable electrode type pulsed arc welder of the invention is that, besides the first-mentioned feature, the comparator issues its detection signal when a differential value from a differentiator for detecting a variation rate of the detected voltage from the voltage detector exceeds a value set by a differential value setting circuit.

A further feature of the afore-mentioned output controller for the consumable electrode type pulsed arc welder of the invention is that, besides the preceding feature, a period setting circuit is provided for setting a voltage rising period at the time of transfer from short-circuit to arc by receiving an output from a short-circuit detector for discriminating the short-circuit and the arc from a comparison between a detected output from the voltage detector and a set value from a reference value setting circuit, and when a time lapse is less than a set period set by the period setting circuit, the detection signal from the comparator is canceled.

A further feature of the afore-mentioned output controller for the consumable electrode type pulsed arc welder of the invention is that, besides the first-mentioned feature, the comparator receives as its inputs, a detected voltage value from the voltage detector and a detected current value from the current detector for detecting the welding current, and performs a comparison arithmetic calculation between a detected resistance value from a resistance value operator for making an arithmetic operation for obtaining a detected resistance value and a reference resistance value from a resistance value setting circuit, and then issues a detection signal when the detected resistance value exceeds the reference resistance value.

A further feature of the afore-mentioned output controller for the consumable electrode type pulsed arc welder of the invention is that, besides the first-mentioned feature, the comparator receives as inputs, a detected voltage value from the voltage detector and a detected current value from the current detector for detecting the welding current, and receives an output signal from a resistance value operator for making an arithmetic operation for obtaining a detected resistance value, an output signal from an initial resistance value memory for memorizing a resistance value at the time of pulse conduction starting, and a set signal set by the resistance value setting circuit, and issues a detection signal when a difference between a detected resistance value of the resistance value operator and an initial resistance value from the initial resistance value memory exceeds a reference resistance value from the resistance value setting circuit.

A further feature of the afore-mentioned output controller for the consumable electrode type pulsed arc welder of the invention is that, besides the first-mentioned feature, the comparator receives as its inputs, a detected voltage value from the voltage detector and a detected current value from the current detector for detecting the welding current, and issues its detection signal when a differential value from a differentiator for detecting a variation rate of the resistance value signal from the resistance value operator for making an arithmetic operation for obtaining a detected resistance value exceeds a set value set by a differential value setting circuit.

A further feature of the afore-mentioned output controller for the consumable electrode type pulsed arc welder of the invention is that, besides the preceding feature, a period setting circuit is provided for setting a voltage rising period at the time of transfer from short-circuit to arc by receiving an output from a short-circuit detector for discriminating the short-circuit and the arc from a comparison between a detected output from the voltage detector and a set value from a reference value setting circuit, and when a time lapse is less than a set period set by the period setting circuit, the detection signal from the comparator is canceled.

As has been described above, according to the above-mentioned invention, during the welding operation, for the time period that is after the detachment of the droplet from the wire tip and transfer to the droplet, the output can be suppressed to the low level of $I_r$. Therefore, the arc force acting on the droplet during the transfer to the droplet can be suppressed. Thereby, the spatter yield can be reduced.

The output controller for the consumable electrode type pulsed arc welder in accordance with the present invention comprises a voltage detector for detecting the welding voltage, a comparator which performs a comparison arithmetic calculation between a detected voltage from the voltage detector and a reference voltage from a voltage setting circuit and issues a detection signal when the detected voltage exceeds the reference voltage, a lowering period setting circuit, a lowered current setting circuit, and a pulse waveform generator to which setting signals from the above-mentioned lowering period setting circuit, from the above-mentioned lowered current setting circuit, from the pulse period setting circuit, from the base current setting circuit, and from the peak current setting circuit, and to which also the detected signal of the above-mentioned comparator are all inputted, and issues a pulse so that the peak current level is lowered, with taking the detected signal from the above-mentioned comparator as a starting time point, to the level of the lowered current which is lower than the peak current and set by the lowered current setting circuit during a lowering period which was set by the above-mentioned lowering period setting circuit and lasts at least until a time point of occurrence of perfect transfer from the droplet to the weld pool.

And, according to the above-mentioned output adjusting circuit of the invention, by performing the control such that, after detecting the droplet detachment timing during the pulse period of the welding operation, by setting the droplet detachment detection signal as the starting point, the peak current level is lowered to the level of the lowered current $I_r$ during a lowering period $t_M$ which lasts at least until a time point of occurrence of perfect transfer from the droplet to the weld pool, the spatter yield can be reduced.

A further feature of the output controller for the consumable electrode type pulsed arc welder of the invention is that, besides the preceding feature, the pulse generator receives an output signal of a lowering period adjusting circuit having its inputs of a setting signal from the lowering period setting circuit and a detected voltage from the voltage detector, and those detected signals from the lowered current setting circuit, from the pulse period setting circuit, from the base current setting circuit, and from the peak current setting circuit, and also receives all the detected signal of the above-mentioned comparator, and then issues a pulse so that the peak current level is lowered, with taking the detected signal from the above-mentioned comparator as a starting time point, to the level of the lowered current which is lower than the peak current and set by the lowered current setting circuit during lowering period $t_M$+lowering adjusting period $\Delta t_M$, which was adjusted by a lowering period adjusting circuit and lasts at least until a time point of occurrence of perfect transfer from the droplet to the weld pool.

And, according to the above-mentioned mode of the invention, during the welding operation, by feeding back the welding voltage and by changing the period in which the peak current is reduced to the lowered current $I_r$ after the detection of the droplet detachment responding with the above-mentioned fed-back welding voltage value, the droplet can be transferred completely to a weld pool. Thereby, the spatter yield can be reduced.

A further feature of the afore-mentioned output controller for the consumable electrode type pulsed arc welder is that, besides the afore-mentioned feature, the pulse waveform generator receives detected signals from the lowering period setting circuit, from a lowered current setting circuit, from a period extension setting circuit, from the pulse period setting circuit, from the base current setting circuit, and from the peak current setting circuit, and also the detected signal of the above-mentioned comparator, and then issues a pulse so that the peak current level is lowered, with taking the detected signal from the above-mentioned comparator as a starting time point, to the level of the lowered current $I_r$, which is lower than the peak current $I_p$ and set by the lowered current setting circuit during a lowering period $t_M$ which was set by the above-mentioned lowering period setting circuit and lasts at least until a time point of occurrence of perfect transfer from the droplet to the weld pool, and the pulse period in which the droplet detachment is detected is extended by an extension period $t_E$ set by the above-mentioned period extension setting circuit.

And, according to the above-mentioned mode of the invention, by extending the pulse period of the pulse of the lowered value $I_r$ of the peak current after the detection of the droplet detachment timing by extending the pulse period by the extension period $t_E$, the spatter is reduced and possibility of undesirable breaking of the arc is avoided, and further the welding voltage can be made uniform. As a result of these, a stable welding can be obtained.

A further feature of the afore-mentioned output controller for the consumable electrode type pulsed arc welder of the invention is that, besides the aforementioned feature, the pulse waveform generator receives an output signal of a lowering period adjusting circuit having its inputs of a setting signal from the lowering period setting circuit and of a detected voltage from the voltage detector, and those detected signals from the lowered current setting circuit, from the period extension setting circuit, from the pulse period setting circuit, from the base current setting circuit, and from the peak current setting circuit, and also receives the detected signal of the above-mentioned comparator, and then issues a pulse so that the peak current level is lowered, with taking the detected signal from the above-mentioned comparator as a starting time point, to the level of the lowered current $I_r$ which is lower than the peak current $I_p$ and set by the lowered current setting circuit during lowering period $t_M$+lowering adjusted period $\Delta t_M$, which was adjusted by the above-mentioned lowering period adjusting circuit and lasts at least until a time point of occurrence of perfect transfer from the droplet to the weld pool, the pulse period in which the droplet detachment is detected being extended by an extension period $t_E$ set by the above-mentioned period extension setting circuit.

And, according to the above-mentioned mode of the invention, by extending the pulse period of the pulse of which droplet detachment timing was detected by the length of extension period $t_E$, and by changing the period in which the peak current is reduced to the lowered current $I_r$ after the droplet detachment detection depending on the above-mentioned fed-back welding voltage value, the droplet can be transferred completely to the weld pool even when the presence of the welding voltage variation. Thereby, the spatter yield can be reduced, and also, the welding voltage can be stabilized, thus giving a stable welding capability.

A further feature of the afore-mentioned output controller for the consumable electrode type pulsed arc welder of the invention is that, besides the afore-mentioned feature, a pulse waveform generator receives an output signal of a lowering period adjusting circuit having its inputs of a setting signal from the lowering period setting circuit and a detected signal from the voltage detector, and an output signal of an extension adjusting circuit having its inputs of a setting signal from the period extension setting circuit and of a detected voltage from the voltage detector, and those detected signals from the lowered current setting circuit, from the pulse period setting circuit, from the base current setting circuit, and from the peak current setting circuit, and also receives the detected signal of the above-mentioned comparator, and then issues a pulse so that the peak current level is lowered, with taking the detected signal from the above-mentioned comparator as a starting time point, to the level of the lowered current $I_r$ which is lower than the peak current $I_p$ and set by the lowered current setting circuit during lowering period $t_M$+lowering adjusted period $\Delta t_M$, which was adjusted by the above-mentioned lowering period adjusting circuit and lasts at least until a time point of occurrence of perfect transfer from the droplet to the weld pool and the pulse period in which the droplet detachment is detected is extended by extension period $t_E$+extension adjusted period $\Delta t_E$ set by the above-mentioned extension adjusting circuit.

And, according to the above-mentioned mode of the invention, by setting in advance the time period $T_M$ during which the peak current is lowered to the lowered current $I_r$ after detection of the droplet detachment from the welding wire tip, and the time period $T_E$ wherein period of the pulse in which the droplet detachment was detected is extended, become $t_M+\Delta t_M$ and $t_E+\Delta t_E$, respectively. These time periods are those in which the lowering adjusting period $\Delta t_m$ and the extension adjusting period $\Delta t_E$, which vary corresponding to the welding voltage value fed back during the welding operation, are added respectively to the lowering period $t_M$ and the extension period $t_E$. Therefore, even when a variation in the welding voltage occur, the droplet can be transferred completely to the weld pool. Thereby, the spatter yield can be reduced, and also, the welding voltage can be stabilized, thus giving a stable welding capability.

A further feature of the afore-mentioned output controller for the consumable electrode type pulsed arc welder of the invention is that, besides the afore-mentioned feature, the lowering period adjusting circuit is a fuzzy inference operation circuit having its inputs of a setting signal from the lowering period setting circuit and a detected voltage from the voltage detector.

And, according to the above-mentioned mode of the invention, in either of the preceding modes, in place of the lowering period adjusting circuit, also by employing a fuzzy inference circuit having the output signal of the voltage detector and the setting signal of the lowering period setting circuit as its input signals, similar effect to that of either of the afore-mentioned modes of inventions is obtainable.

A further feature of the afore-mentioned output controller for the consumable electrode type pulsed arc welder of the invention is that, besides the afore-mentioned feature, the extension adjusting circuit is a fuzzy reasoning circuit having its inputs of a setting signal from the above-mentioned period extension setting circuit and a detected voltage from the voltage detector.

And, according to the above-mentioned mode of the invention, in the preceding modes, in place of the extension period adjusting circuit, also by employing a fuzzy inference circuit having the output signal of the voltage detector and the setting signal of the lowering period setting circuit as its input signals, similar effect to that of the preceding invention is obtainable.

[EFFECT OF THE INVENTION]

In a consumable electrode type pulsed arc welding method using a shielding gas including carbon dioxide gas as its main composition and using alternate flowings of a peak current and a base current which is lower than the peak current, in general, a droplet grown from melted wire tip is subject to arc force, surface tension, and gravitational force. Balance held among these forces is lost along with the growth of the droplet, thereby eventually making the droplet detachment out from the wire tip. The conventional process is explained by using a schematic drawing of FIG. 2 wherein the process is illustrated making a correspondence between the process and the output voltage.

In FIG. 2, (a) to (f) are drawings illustrating the state of the droplet on the tip of a wire. Therein temporal correspondence with the welding voltage waveform is shown by arrows. When the state transfers from the basic period to the pulse period, the droplet 41 grows rapidly (FIG. b). When the droplet grows to a certain extent, a constricted portion k is produced immediately below a solid part 40 of the wire ((c) of FIG. 2). This constricted portion k is extended with time.

After a certain time lapses, the droplet escapes from the wire tip ((d) of FIG. 2). At this time, an arc 42 becomes longer than before, since the pole moves from the bottom of the droplet to the tip part of the wire. The arc length becomes further longer, being assisted also by such effect that a part g of the wire having a small heat capacity is melt directly by the arc. Since this increase of the arc length induces a voltage rise on the welding voltage, the welding voltage waveform rises rapidly on a course from the state shown in c of FIG. 2 to that shown in ((d) of FIG. 2). Thereafter, the wire starts melting again and a droplet is formed. However, because of the relation between the wire feeding speed and the melting amount, the arc length does not become short ((e) of FIG. 2).

When the peak current period terminates and entering into next base current period, because the current becoming low there, the melting amount becomes small with respect to the wire feeding speed, thereby making the arc length short again (FIG. 2(f)). As has been mentioned above, having a boundary at the time of the droplet detachment, voltage becomes higher at the last half part of the pulse in comparison with that at the first half part of the pulse period. This voltage rise can also be detected as a resistance value rise due to the arc length increase.

According to the present invention, the rise of voltage or resistance caused by the droplet detachment can be detected by a comparison detection using a comparison with respect to an absolute value or by an increment detection using an increment starting from the pulse initial time or by a rise-rate detection using a differential. Thereby an detachment detection signal can be issued as an output in keeping the synchronism with the droplet detachment. By receiving this detachment detection signal, the welder output is lowered during a certain lowering period. By this procedure, arc force acting on the droplet under transferring state starting from the detachment out of the droplet from the wire tip is weakened, thereby suppressing spray of the spatter.

Generally, the consumable electrode type pulsed arc welding using a shielding gas including carbon dioxide gas as its main composition is carried out under the droplet transfer state, and there is a possibility that a short-circuiting takes place depending on the working condition. At the time when the short-circuiting is recovered and the state transfers to the arc, the voltage rises abruptly. In the case that the detachment a detection signal is produced using differential of voltage or arc resistance, this short-circuit recovery gives an erroneous detection signal. Therefore, there is a necessity of canceling such the differential signal at the time of short-circuiting recovery.

By changing a time-length of the lowering period, wherein the welder output is lowered, by a detection of the droplet detachment depending on the welding voltage value, it becomes possible to make the droplet transfer to the weld pool state reliably at a lowering current I of a low level even in a case that the welding voltage changes. In this way, the spatter yield can be reduced.

And, depending on a selection of pulse frequency, it is not always assured that the droplet detachment takes place at all in connection with the pulse. In this case, between the pulse in which the droplet detachment takes place and the pulse in which the droplet detachment does not take place, an imbalance is produced. In such case, by elongating the pulse period of the pulse in which the droplet detachment takes place, the imbalance is corrected and thereby it becomes possible to make the welding voltage uniform and to attain a stable welding.

Hereupon, for the adjustment of the lowering period in which the welder output is lowered in accordance with the detection of occurrence of the droplet detachment, a fuzzy inference operation can be employed. And, for the adjustment of the elongated period of pulse period of the pulse in which the droplet detachment took place, a fuzzy predictor having a certain constant elongated period signal set by the elongated period setting means and a voltage signal detected by a voltage detection means as its input signal can be used.

It will be recognized that some or all of the Figures are schematic representations for purposes of illustration and do not necessarily depict the actual relative sizes or locations of the elements shown.

DESCRIPTION OF THE PREFERRED EMBODIMENT

In the following, explanation is given on examples with reference to the accompanying drawings.

[EXAMPLE 1]

Figure 1:
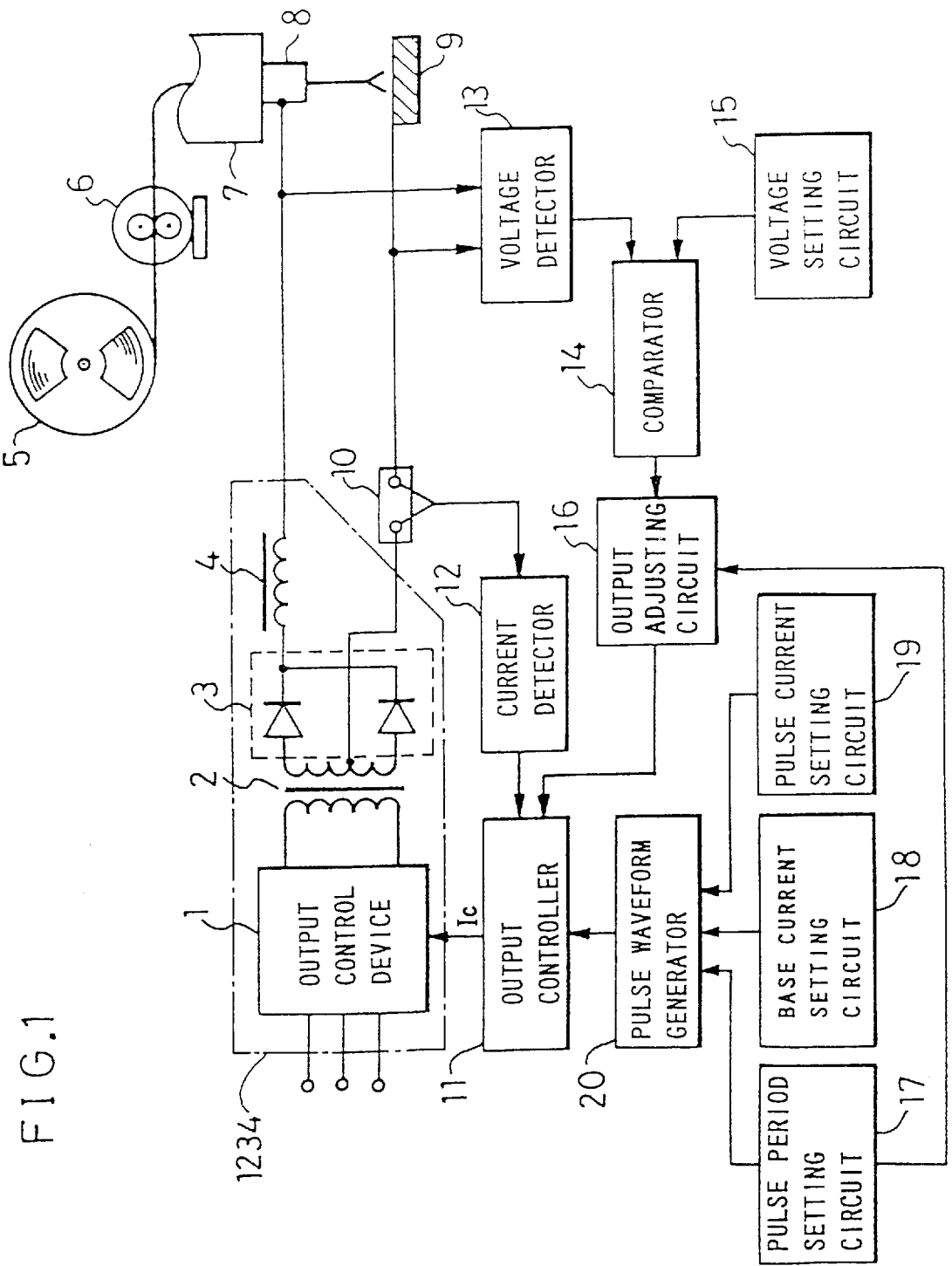
FIG. 1 is a block diagram showing the constitution of the output control apparatus of a consumable electrode type pulsed arc welder in accordance with an Example 1 of the present invention.

FIG. 1 is a drawing showing a first example of the present invention. Periodic output trace waveform are formed by a pulse waveform generator 20 for defining a peak current $I_p$, value of which is set by a peak current setting circuit 19 and duration or pulse period of which is set by a pulse period setting circuit 17, and also a base current $I_b$, value of which is set by a base current setting circuit 18 and the duration or the pulse period is set by the same pulse period setting circuit 17. In the output controller 11, the output current is controlled so as to be in agreement with the above-mentioned output trace waveform, and this output signal is inputted into an output control device 1. The output thus controlled by the output control device 1 is voltage-transformed to a lower voltage by a transformer 2 and rectified into a DC current by a rectifier 3, and then smoothed by a reactor 4, and applied across an electrode 8 and a base metal 9. Thus the output control of a pulse welder is carried out. On the other hand, by a voltage detector 13, the welding voltage waveform is inputted into a comparator 14 as a detected voltage $V_O$, and therein compared with a reference voltage $V_{ref}$ set by a voltage setting circuit 15.

Figure 2:
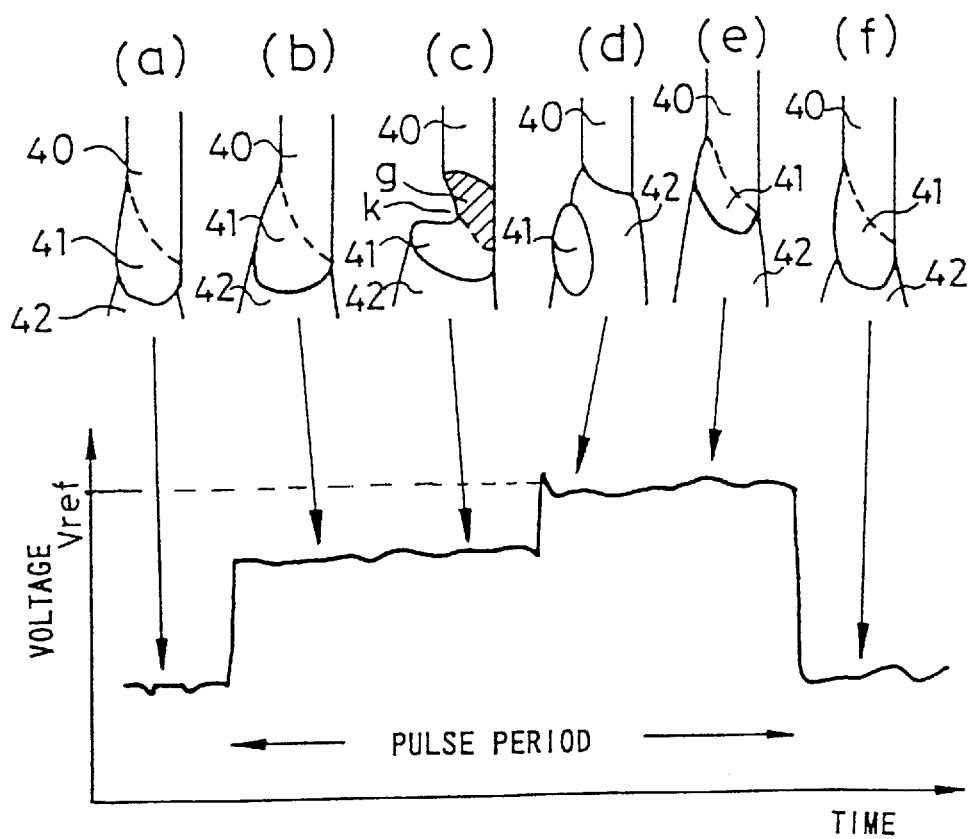
FIG. 2 is a schematic drawing of the prior art illustrating the relation between the state of the droplet and the state of the output voltage.
Figure 3:
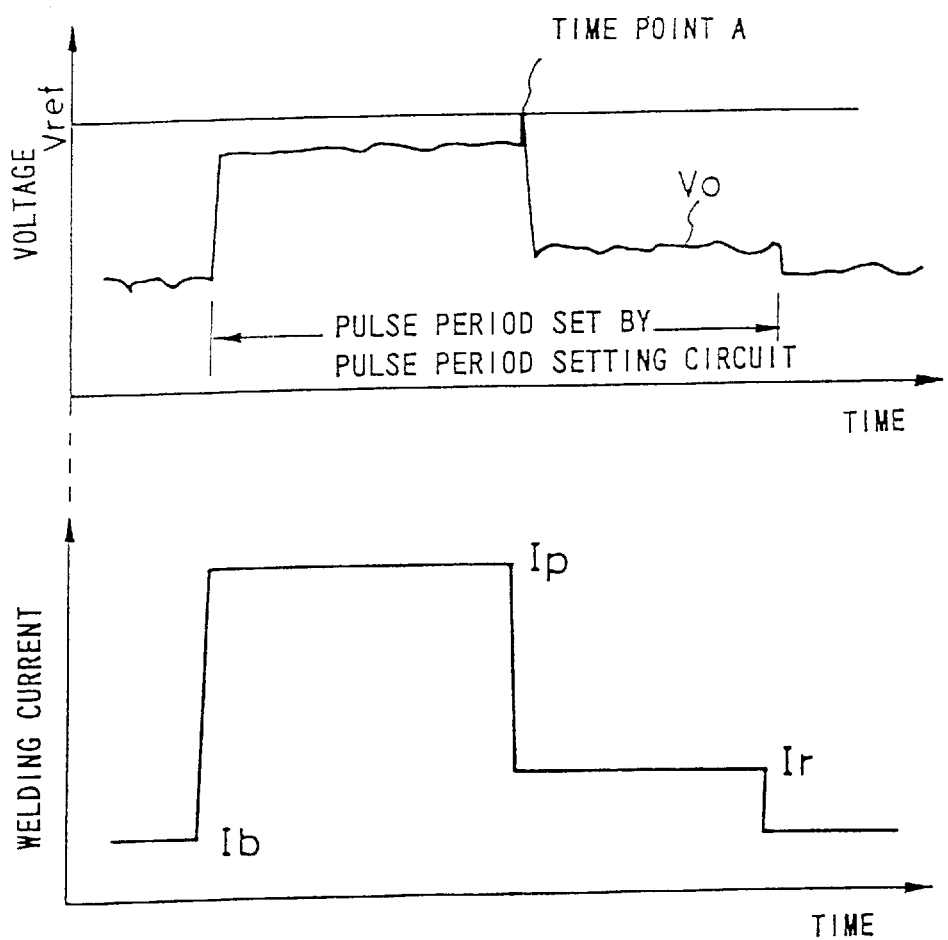
FIG. 3 is a waveform chart showing the relation between the output voltage/current and the detachment detection in the Example 1.

In the following, the operation of the circuit is explained using FIG. 3, which shows a relation among a detected voltage $V_O$, a welding current, and the reference voltage $V_{ref}$. Hereupon, in FIG. 3, the voltage waveform becomes a different waveform from that of FIG. 2, because the output in that period is dropped to a lower level upon detection of the droplet detachment. In the upper curve of FIG. 3, the reference voltage $V_{ref}$ takes a value set by the voltage setting circuit 15.

As has been described above, when a droplet detachment takes place during the peak current conduction period, the voltage rises and then exceeds the level of the reference voltage $V_{ref}$ at the time point A.

In such the manner, the comparator 14 issues a detachment detection signal at the time point A. An output adjusting circuit 16 receives the above-mentioned detachment detection signal and issues a signal to the output controller 11. In accordance with this signal, as is shown by a lower curve of FIG. 3, the output controller 11 issues such a control signal $I_c$ as to make an output current from an output circuit 1234 to a lower level signal $I_r$ than the peak current $I_p$, during the pulse period after the detachment detection signal (at the time point A) within the pulse period (which was set by the pulse period setting circuit 17). By the above action of the circuit, signal from the pulse generator 20 is adjusted low. As a result, the output current of the output circuit 1234 becomes such that, as shown by the lower curve of FIG. 3, the current $I_p$ is greater in the first half part of the pulse period, and then becomes to the lower level of $I_r$ after the droplet detachment detection time point A. Thereby the arc force acting on the droplet after the detachment is weakened, and the occurrence of the spatter spray can be prevented.

[EXAMPLE 2]

Figure 4:
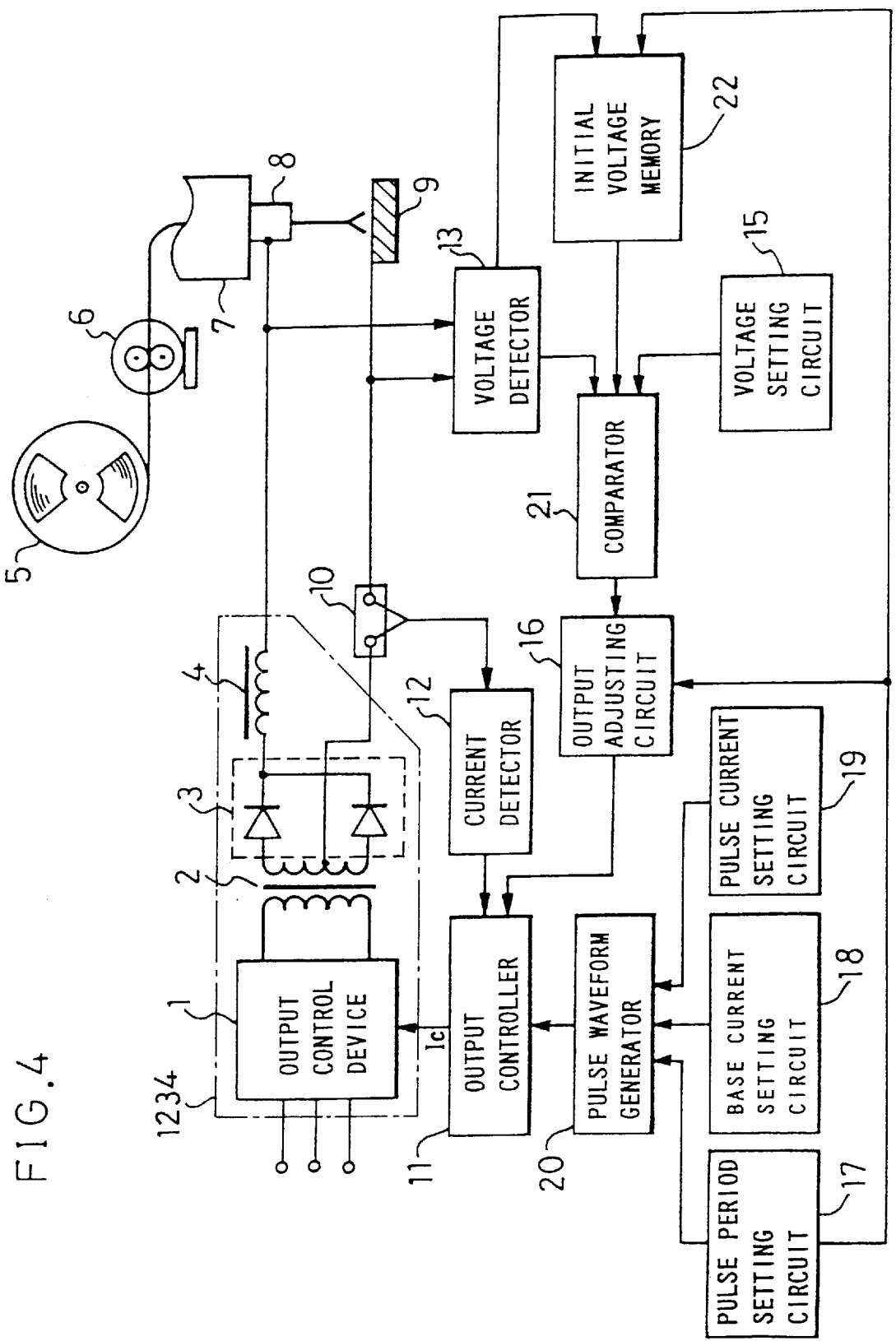
FIG. 4 is a block diagram showing the constitution the output control apparatus of the consumable electrode type pulsed arc welder in accordance with an Example 2 of the present invention.

FIG. 4 is a drawing showing a second example of the present invention. In the drawing, an initial voltage memory 22 memorizes an input from a voltage detector 13 at a point of time which is after a constant time period counted from the starting of pulse conduction upon receiving the output of the pulse period setting circuit 17. Hereupon, the above-mentioned constant time period starting from the pulse conduction start is determined by a response speed which is also determined by such as time constants of the power supply circuit, and the constant time period is normally set around 1 ms.

In the comparator 21, a voltage difference $\Delta V$ between a memorized voltage of the above-mentioned initial voltage memory 22 and the input voltage value of the voltage detector 13 is calculated. To the comparator 21, a reference voltage $V_{ref}$ is inputted separately from the voltage setting circuit 15. At a point of time when $\Delta V$ exceeds $V_{ref}$, the comparator 21 issues the detachment detection signal. Operations thereafter are substantially the same with that of the first example described above. In this example, similarly to in the first example, it is possible to obtain the effect that the arc force acting on the droplet after the detachment is weakened and thereby the spatter spray is prevented.

[EXAMPLE 3]

Figure 5:
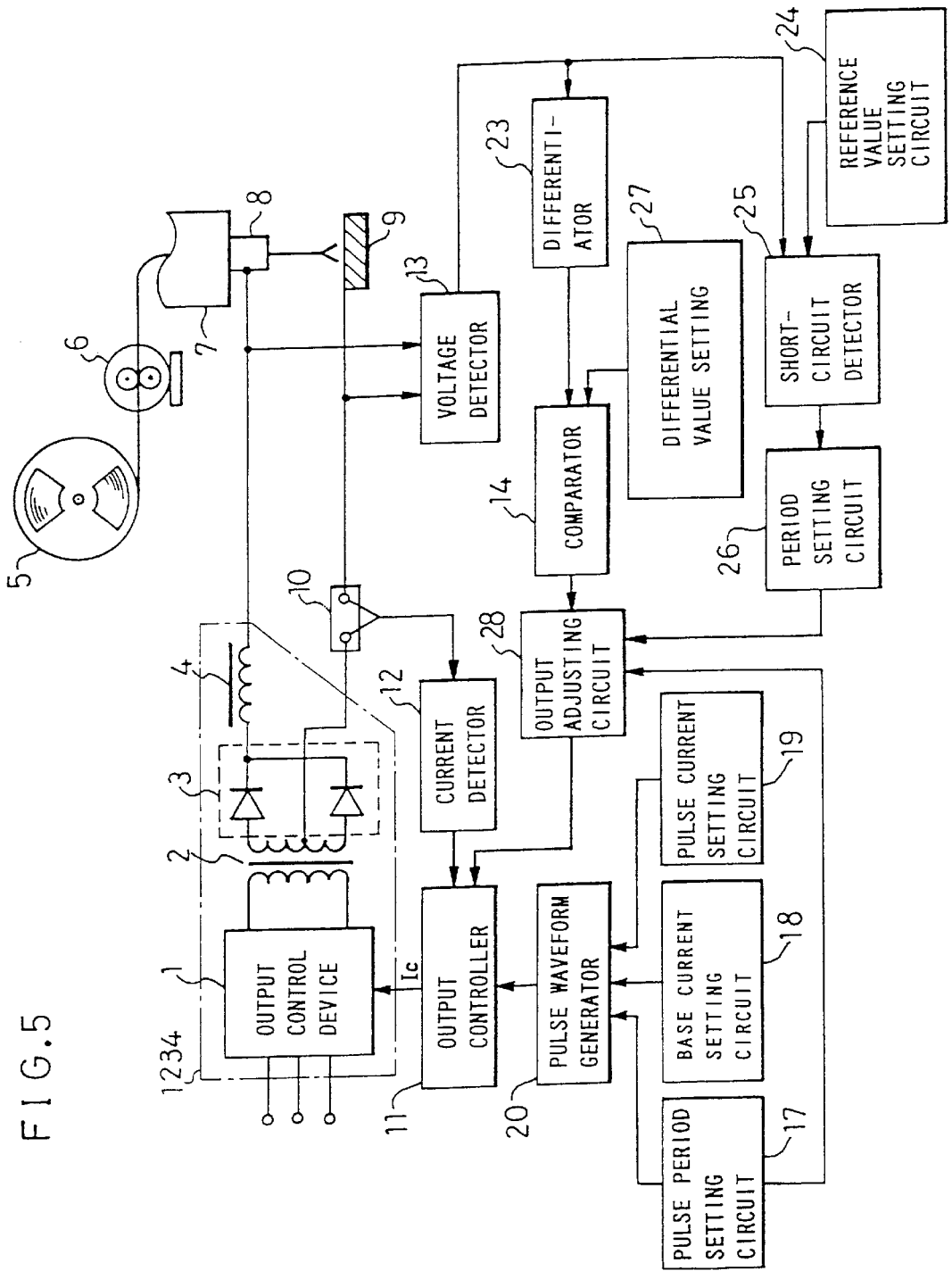
FIG. 5 is a block diagram showing the constitution of the output control apparatus of a consumable electrode type pulsed arc welder in accordance with the Example 3 of the present invention.

FIG. 5 is a drawing showing a third example of the present invention. With regard to the drawing, a differentiator 23 differentiates the detected voltage from the voltage detector 13. A differentiated value dV/dt thus derived is inputted into the comparator 14, where it is compared with a reference value $V_{dr}$ given from a differential value setting circuit 27. At a time point when dV/dt exceeds $V_{dr}$, the comparator 14 issues the detachment detection signal. On the other hand, a short-circuit detector 25 compares the detected voltage given from the voltage detector 13 and with the input from the reference voltage setting circuit 24. The short-circuit detector 25 issues the arc state signal when the detected voltage is larger; and it issues the short-circuit state signal when the detected voltage is smaller. A period setting circuit 26 receives a signal from the above-mentioned short-circuit detector 25 and counts a certain constant time period starting from the point of time when the short-circuit state transfers to the arc state. The counted time period is determined by the response speed which is also determined by such as time constants of the power supply circuit; and it is normally around 1 ms.

In such a manner, into the output adjusting circuit 28, the outputs from the comparator and from the period setting circuit 26 are inputted, and for the counted time period or period of H level of the output signal issued from the above-mentioned period setting circuit 26, the detachment detection signal from the comparator 14 is canceled. Furthermore, the output adjusting circuit 28 receives input from the pulse period setting circuit 17 and cancels the detachment detection signal for a constant time period after a changing from the base current conduction to the pulse conduction. This constant time period is determined by the response speed which is also determined by such as time constants of the power supply circuit and it is normally around 1 ms. The reason of carrying out cancellation using these two detachment detection signal system is for preventing erroneous detection. That is, the dual detachment detection signal system prevents those erroneous detection due to voltage rises at the time of transfer from the short-circuit state to the arc state, as well as, due to differential value rise at the time or caused by the voltage rise at the time of transfer from the basic conduction to the pulse conduction. By this devising, only such the signal induced by the normal differential value rise caused by the droplet detachment can be selected as a normal signal. By the detachment detection signal selected in such manner, the output adjusting circuit 28 issues the signal to the output controller 11.

In accordance with the detachment detection signal selected in such manner, the output controller 11 issues such a signal $I_c$ as to make an output current from an output circuit 1234 to a lower level signal $I_r$ than the peak current $I_p$, during the pulse period after the detachment detection signal (at the time point A) within the pulse period (which was set by the pulse period setting circuit 17). Operations thereafter are substantially the same as that of the aforementioned first example.

[EXAMPLE 4]

Figure 6:
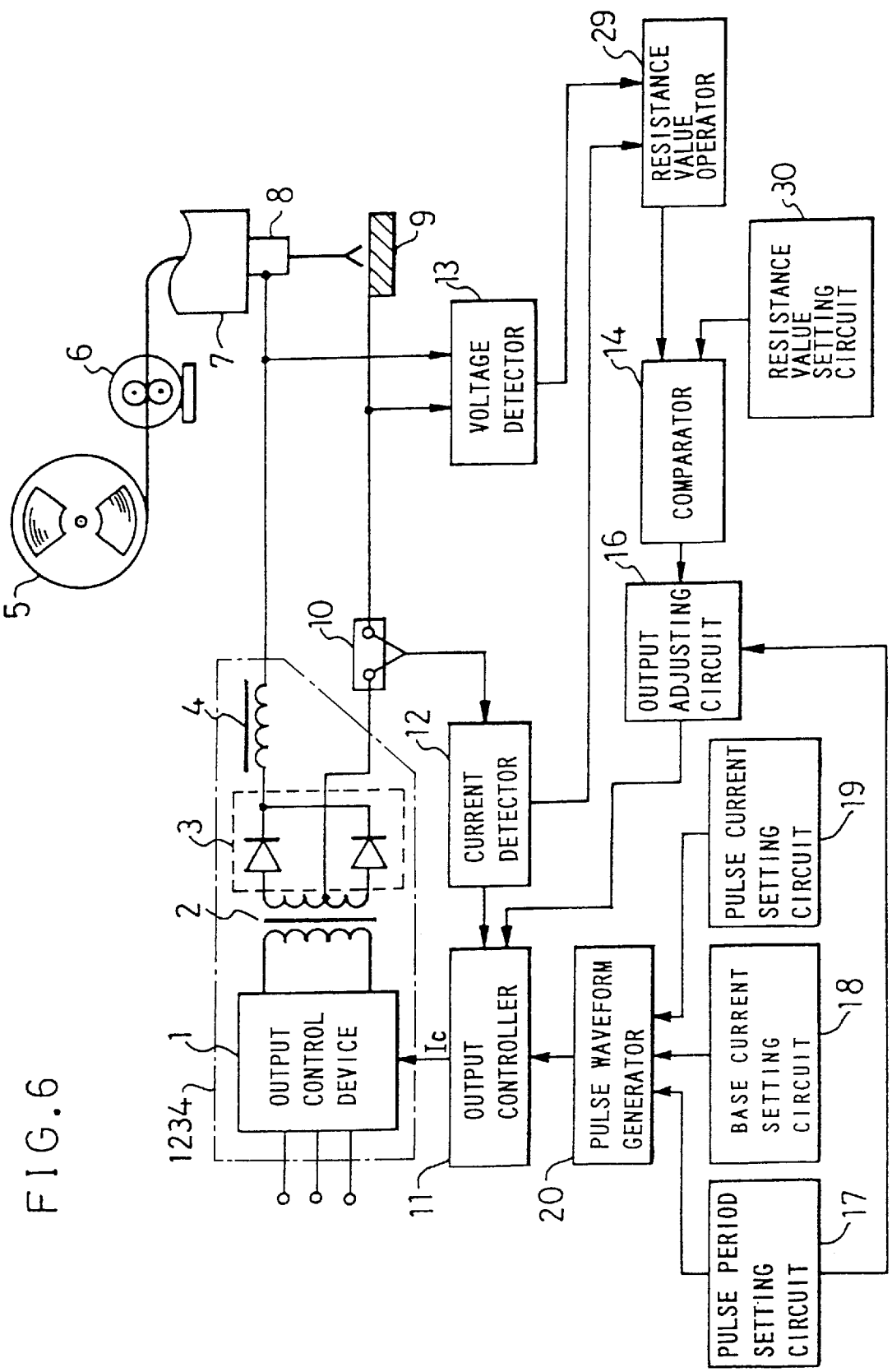
FIG. 6 is a block diagram showing the constitution of the output control apparatus of a consumable electrode type pulsed arc welder in accordance with an Example 4 of the present invention.

FIG. 6 is a drawing showing a fourth example of the present invention. Different from the afore-mentioned first to third examples (FIGS. 1, 3, and 5) in which the detachment detection has been made by the detected voltage detected by the voltage detector 13, in this fourth example of FIG. 6, the similar detachment detection is obtained by using a resistance signal. In FIG. 6, a resistance value operator 29 calculates a resistance value from output current and output voltage values from a current detector 12 and a voltage detector 13, and thereby the result is issued to the comparator 14. The comparator 14 compares an input resistance value from the resistance value operator 29 and a reference resistance value from a resistance value setting circuit 30. The comparator 14 issues the droplet detachment detection signal to the output adjusting circuit 16 at a time point when the input resistance exceeds the reference resistance. In such manner, by detecting the rise of the resistance value associated with the droplet detachment, similarly to in the first example, it is possible to obtain the effect that the arc force acting on the droplet after the detachment is weakened and thereby the spatter spray is prevented. Working after the output adjusting circuit 16 are the same as that of the afore-mentioned first example.

[EXAMPLE 5]

Figure 7:
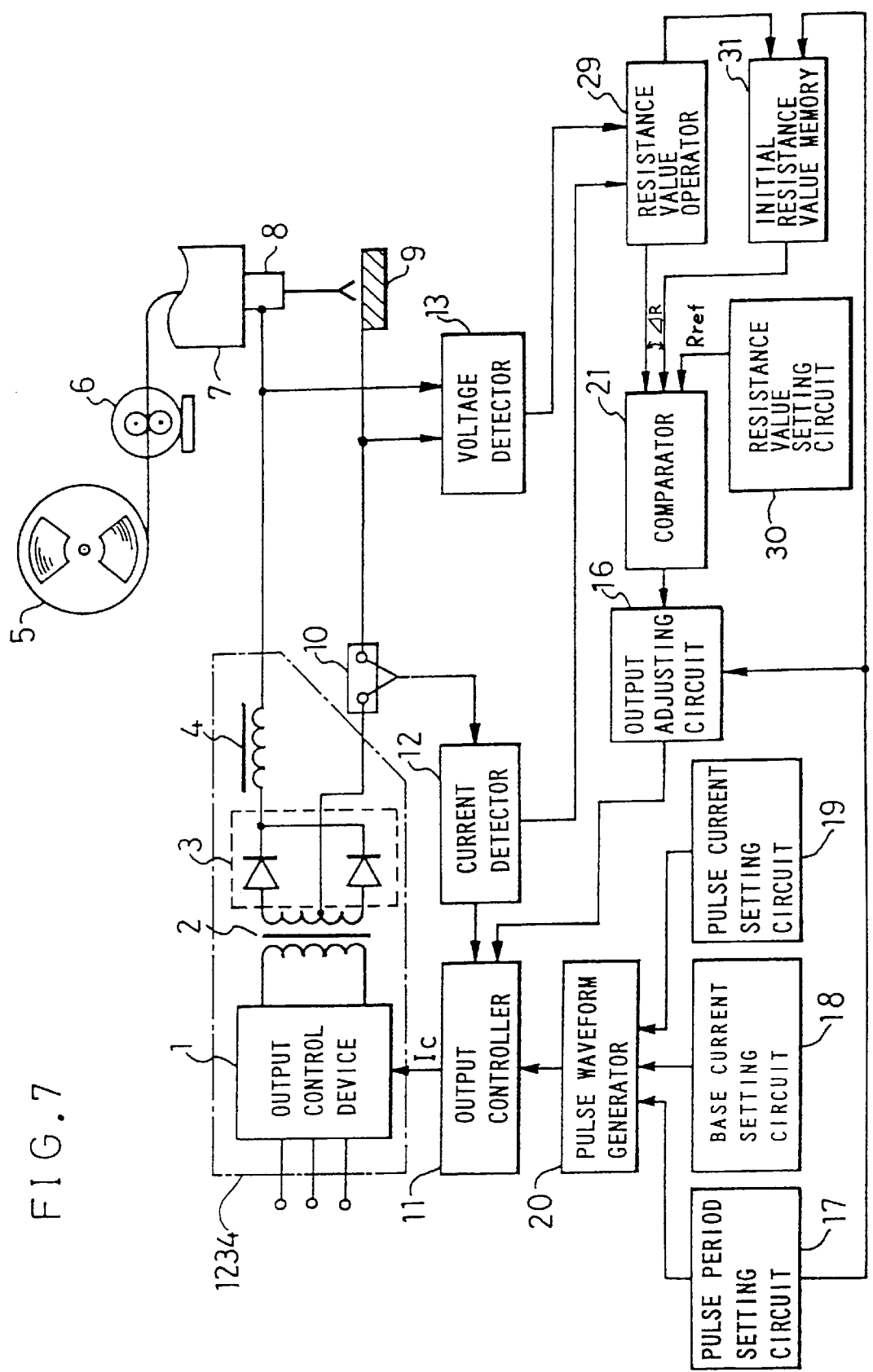
FIG. 7 is a block diagram showing the constitution of the output control apparatus of a consumable electrode type pulsed arc welder in accordance with an Example 5 of the present invention.

FIG. 7 is a drawing showing a fifth example of the present invention. In FIG. 7, the resistance value operator 29 calculates a resistance value from output current and output voltage values from a current detector 12 and a voltage detector 13, respectively; and the calculated result is issued to the comparator 21 and also to an initial resistance value memory 31. The initial resistance value memory 31 further receives the output from the pulse period setting circuit 17 and memorizes an input from the resistance value operator 29 at a point of time after a constant time interval starting from the pulse conduction start. In the comparator 21, a resistance value difference ΔR between the resistance value of the above-mentioned initial resistance value memory 31 and the input value to the resistance value operator 29 is calculated. To the comparator 21, a reference resistance value $R_{ref}$ is inputted separately from the resistance value setting circuit 30. At a time point when ΔR exceeds $V_{ref}$, the comparator 21 issues the detachment detection signal to the output adjusting circuit 16. In such the manner, by detecting the rise in the resistance value accompanying with the droplet detachment, similar effects to that of the aforementioned second example can be obtained. Hereupon, operations after the output adjusting circuit 16 are the same as those of the aforementioned second example.

[EXAMPLE 6]

Figure 8:
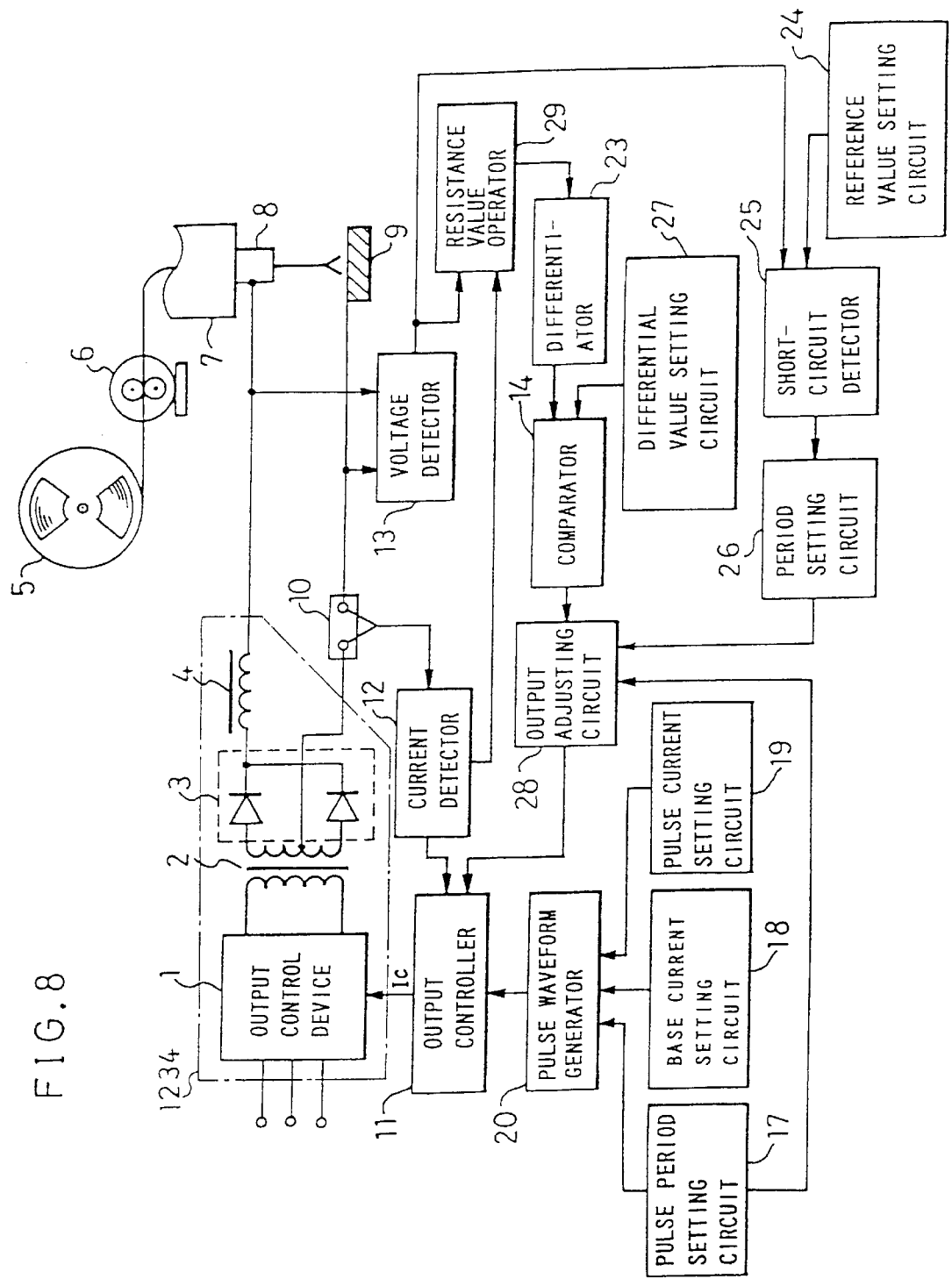
FIG. 8 is a block diagram showing the constitution of the output control apparatus of a consumable electrode type pulsed arc welder in accordance with an Example 6 of the present invention.

FIG. 8 is a drawing showing a sixth example of the present invention. In FIG. 8, the resistance value operator 29 calculates a resistance value from output current and output voltage values from a current detector 12 and a voltage detector 13, respectively and the calculated result is issued to a differentiator 23. Therefore the comparator 14 compares a differential value of the resistance value dR/dt with a reference value $R_{dr}$ of a differential value setting circuit 27, and issues the detachment detection signal at a point of time when dR/dt exceeds $R_{dr}$. By performing such operation, similar effects to those of the afore-mentioned third example can be obtained. Operations after the output adjusting circuit 28 are the same as that of the aforementioned third example.

In the examples described above, the setting value $I_r$ is a value for a low level output setting, and therefore it is also possible to use the setting value $I_b$ of the base current setting circuit 18 therefor.

[EXAMPLE 7]

Figure 9:
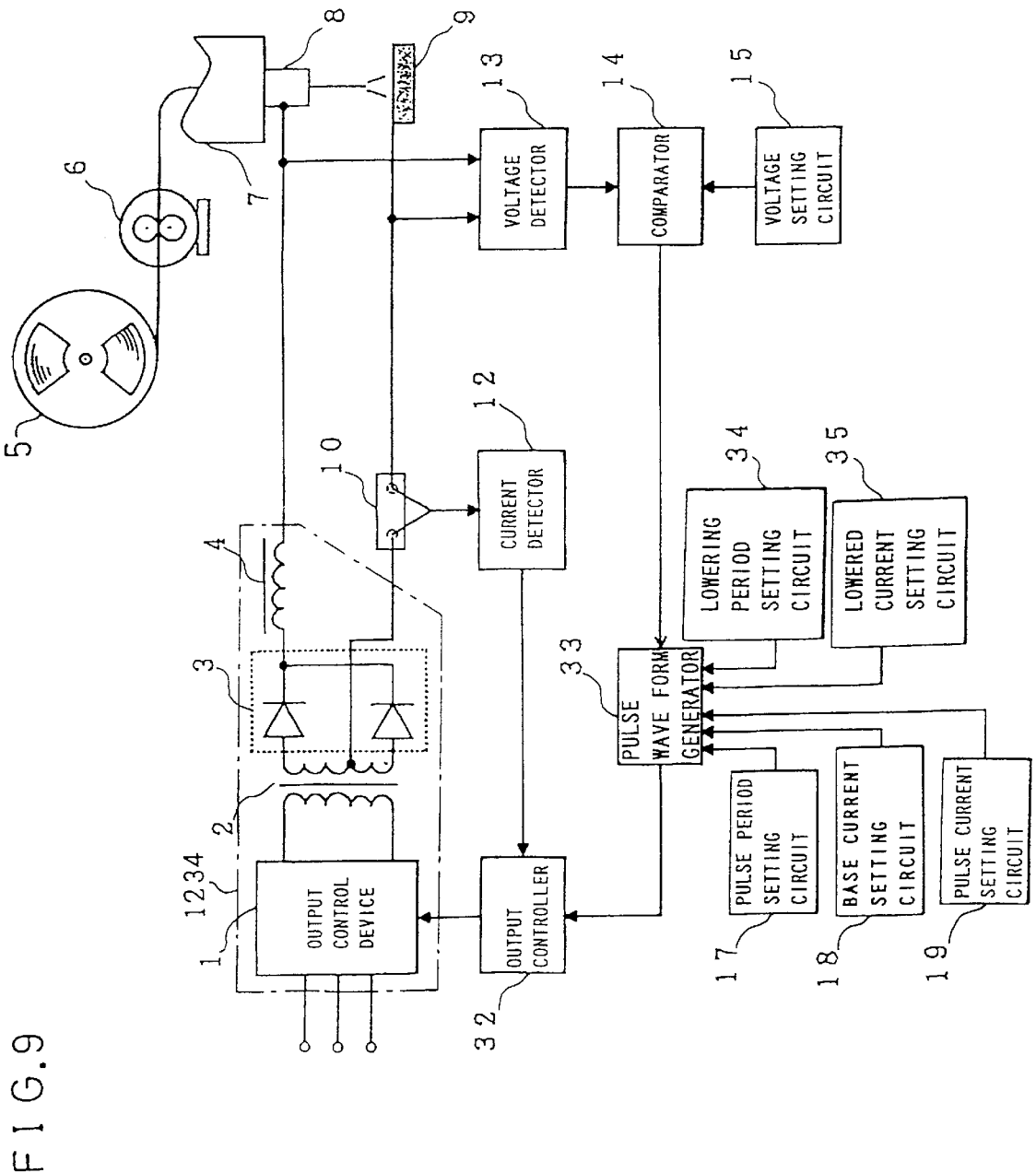
FIG. 9 is a block diagram showing the constitution of the output adjusting circuit of the output control apparatus of a consumable electrode type pulsed arc welder in accordance with an Example 7 of the present invention.

FIG. 9 is a drawing showing a seventh example of the present invention and a concrete example of the output adjusting circuit 28 in those respective first to sixth examples. Hereupon, the whole or general configuration is similar to those of the first to sixth examples and has the same function, and hence those aforementioned explanations and notations can be applied also in this example. Therefore redundant overlapping description is avoided here. Those respective setting signals from a lowering period setting circuit 34, a lowered current setting circuit 35, the pulse period setting circuit 17, the base current setting circuit 18, and the peak current setting circuit 19 and also an output signal of the comparator 14 are all inputted into a pulse waveform generator 33. The detected signal from the current detector 12 and the output signal from the above-mentioned pulse waveform generator 33 are inputted into an output controller 32.

The action of this circuit is explained below. In the case that the droplet detachment detection signal from the comparator 14 is absent during the pulse period in the welding operation, the pulse waveform generator 33 issues to the output controller 32 a pulse signal of a waveform formed by a pulse period $t_p$, a base period $t_b$, a base current $I_b$ set by the base current setting circuit 18, and a peak current $I_p$ set by the peak current setting circuit 19.

On the other hand, in the case that, a signal to indicate the droplet detachment timing being issued from the comparator 14 is present during the pulse period in the welding operation, the above-mentioned pulse waveform generator 33 issues to the output controller 32 a signal of lowered level current waveform. The lowered level current signal is such that, only with regard to those pulses in which the droplet detachment is detected, at least for a lowering time period $T_M$ counted from the point of time of droplet's detachment to the completion of transfer of the droplet into the weld pool, the current is reduced to a lowered level circuit $I_r$ set by the lowered current setting circuit 35, which is no higher than the peak current $I_p$.

At the output controller 32, the detected current from the current detector 12 and the pulse waveform signal from the above-mentioned pulse waveform generator 33 are inputted. Then the output is controlled in a manner that the above-mentioned detected current becomes to coincide with the above-mentioned pulse waveform. The output of this output controller 32 is inputted into the output control device 1. As a result, the level of the output current waveform becomes such that it is $I_p$ in the first half part of the pulse period, and then is lowered to the value of $I_r$ for a certain time period $t_M$ after the droplet detachment detection. Thus, the arc force acting on the droplet after the droplet detachment is weakened so as to be able to prevent the spatter spray. This lowering period $t_M$ is set by the lowering period setting circuit 34.

Figure 10:
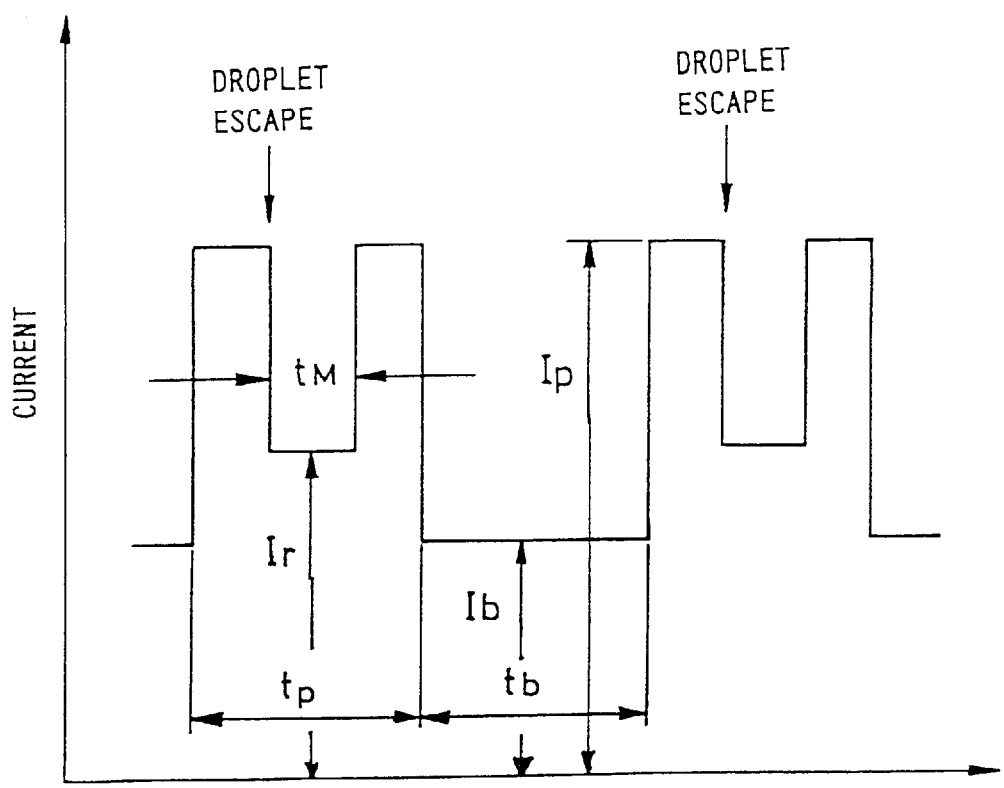
FIG. 10 is a schematic waveform chart showing one example of the welding current waveform in the Example 7 of the present invention.

FIG. 10 shows an example of welding current waveforms which was obtained by the present example (Example 7). Hereupon, the drawing shows such an example that the lowered current $I_r$, which starts at the point of time of droplet detachment after the droplet detachment detection, is of a value between the peak current $I_p$ and the base current $I_b$. However, in order to enhance the effect of reducing the spatter yield, it is desirable to set this lowered current $I_r$ to be the base current $I_b$.

[EXAMPLE 8]

Figure 11:
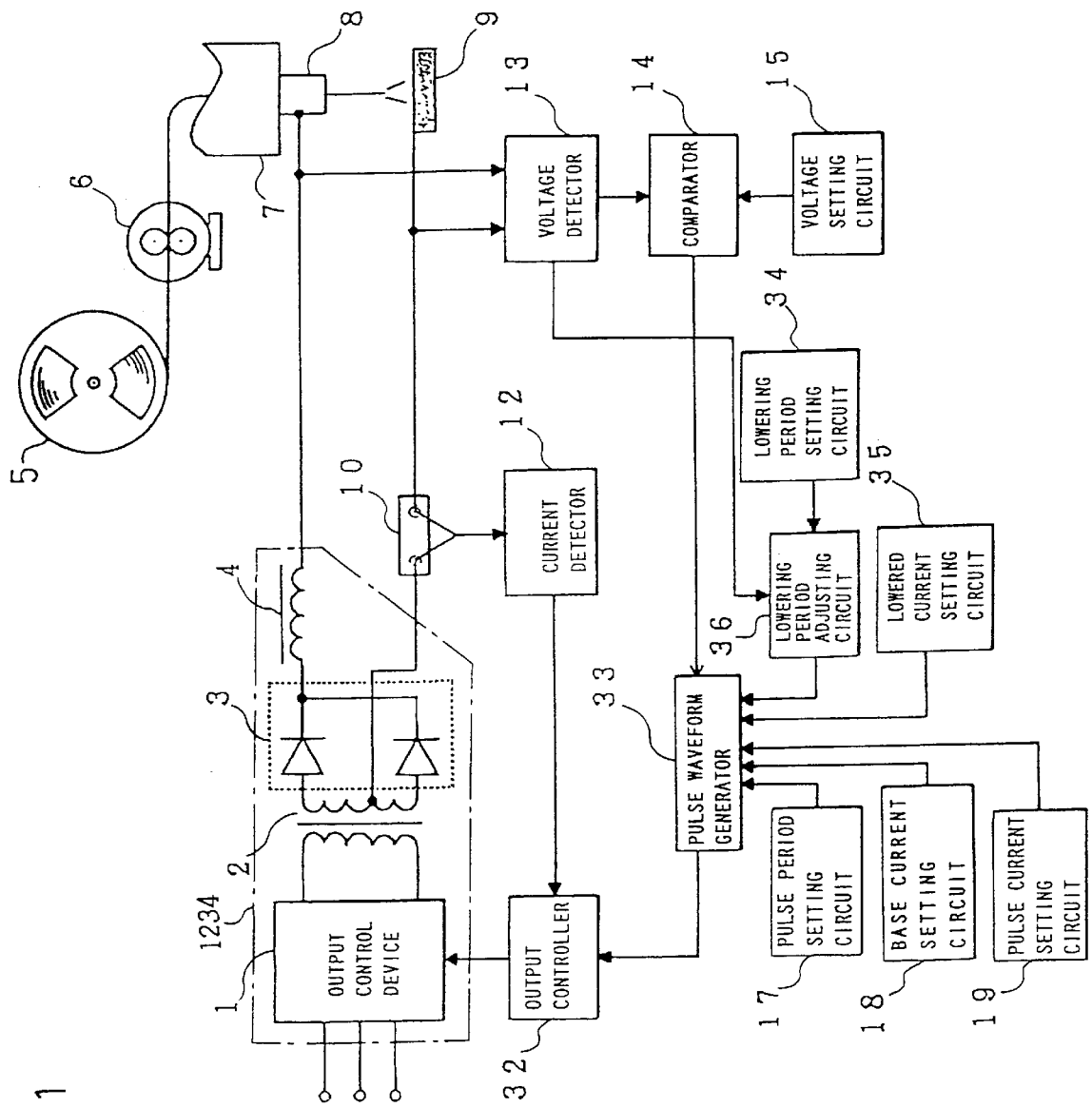
FIG. 11 is a block diagram showing the constitution of the output adjusting circuit of the output control apparatus of a consumable electrode type pulsed arc welder in accordance with an Example 8 of the present invention.

FIG. 11 is a drawing showing an example of the output adjusting circuit as an eighth example of the present invention. Hereupon, the whole configuration of the output controller is similar to those of those first to sixth examples and has the same function, and therefore those aforementioned explanations and notations can be applied also in this example. Therefore redundant overlapping description is avoided here. In an output adjusting circuit of the present example, the lowering period setting circuit 34, which generates one of those input signals to the pulse waveform generator 33 of the output adjusting circuit in the above-mentioned seventh example, is replaced by a lowering period adjusting circuit 36. Hereupon, for those elements having the same or substantially the same functions as those in the seventh example, the same numerals are given, and overlapping explanation thereon is omitted. In the present example, the lowering period adjusting circuit 36 receives output signal of the lowered period setting signal of the lowering period setting circuit 34 and the output signal of the voltage detector 13 as its input signals, and adjusts the lowering time period.

Next, the action of the circuit is explained below. Hereupon, overlapped explanations on the actions of those common parts with those of the above-mentioned seventh example are omitted. To the lowering period adjusting circuit 36, a feedback signal of the welding voltage from the voltage detector 13 and the setting signal of the lowering period setting circuit 34 are inputted. In the initial period of the welding operation after an arc started, the lowering period $t_M$ set by the above-mentioned lowering period setting circuit 34 is issued without any adjustment from the above-mentioned lowering period control circuit 36. By considering the transient period from starting of an arc to stabilization of the arc, the above-mentioned welding initial time period is set to be around 1 second.

During the welding operation, a time period $[t_M + \Delta t_M]$ obtained by adding a lowering adjustment period $\Delta t_M$, which is variable responding with the welding voltage value fed-back from the above-mentioned voltage detector 13, to the lowering period $t_M$ set by the above-mentioned lowering period setting circuit 34, that is, lowering period $t_M$+lowering adjustment period $\Delta t_M$, is issued from the above-mentioned lowering period adjusting circuit 36.

Therefore, in the case that, a signal to indicate the droplet detachment time being issued from the comparator 14 is present during the pulse period in the welding operation, the above-mentioned pulse waveform generator 33 issues to the output controller 32 a pulse signal of lowered level current waveform. The lowered level current pulse signal is such that, only with regard to those pulses in which the droplet detachment is detected, at least for a lowering time period $t_M$ counted from the point of time of droplet's detachment to the completion of transfer of the droplet into the weld pool, added with the lowering adjustment period $\Delta t_M$, that is for the total time period $t_M + \Delta t_M$, the current is reduced to a lowered level current $I_r$ set by the lowered current setting circuit 35; and the current $I_r$ is set by the lowered current setting circuit 35, and the current $I_r$ is no higher than the peak current $I_p$.

As a result, the output current waveform becomes such that it has a level $I_p$ in the first half part of the pulse period and becomes a lower value of $I_r$ in the time period $t_M + \Delta t_M$ after the droplet detachment detection. Thus, the arc force acting on the droplet after detachment is weakened, thereby enabling to prevent the spatter spray. This lowering period $t_M + \Delta t_M$ is set by the lowering period adjusting circuit 36.

The above-mentioned lowering adjusted period $\Delta t_M$ differs depending on ranges of the initial setting voltage, and boundaries between ranges of the initial setting voltage is complicated. Because of such reason, in the present invention, it is preferable to derive arithmetically the lowering time period $T_m$+the lowering adjusted period $\Delta t_M$ by the fuzzy inference operation.

[EXAMPLE 9]

Figure 12:
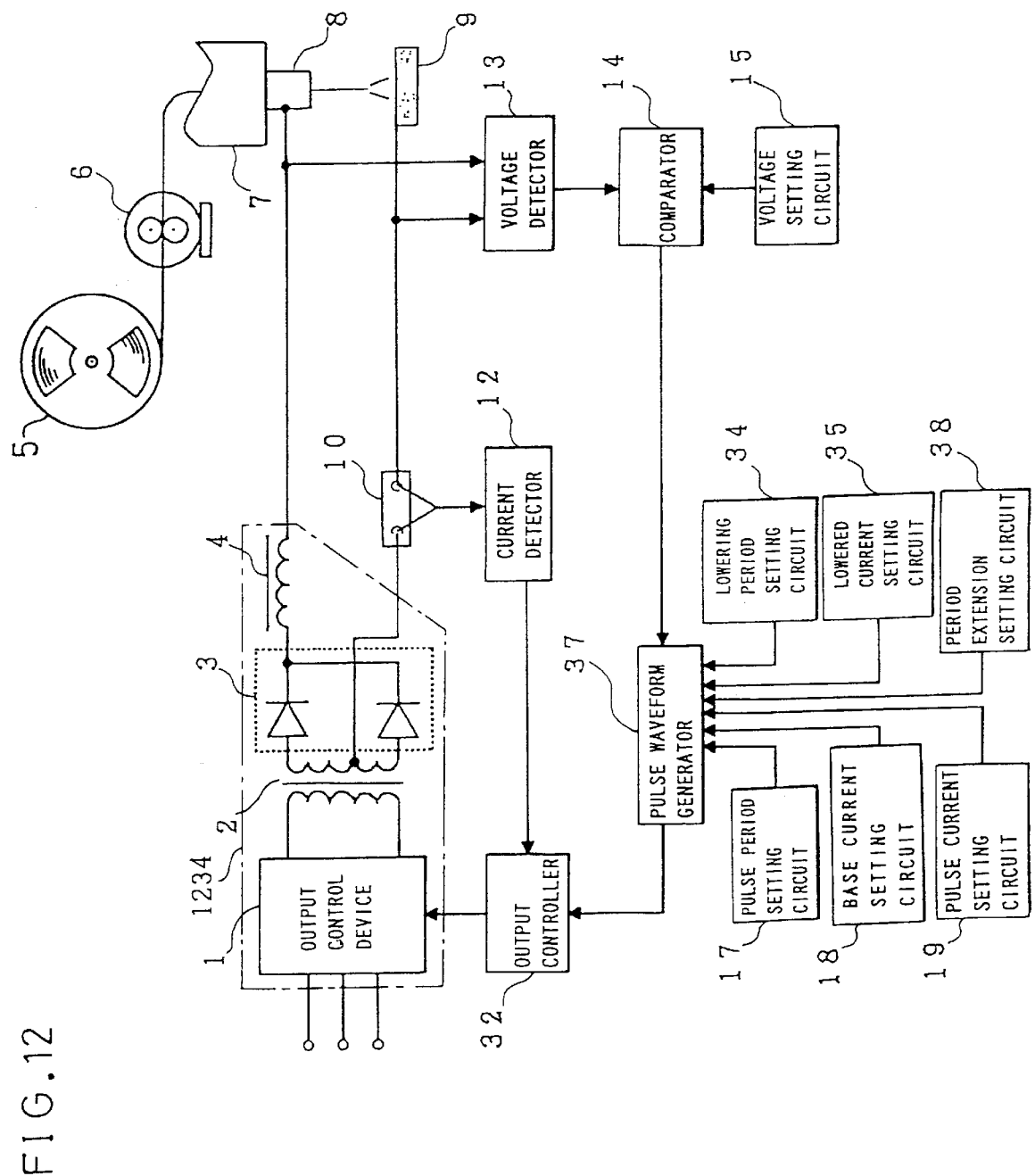
FIG. 12 is a block diagram showing the constitution of the output adjusting circuit of the output control apparatus of a consumable electrode type pulsed arc welder in accordance with an Example 9 of the present invention.

FIG. 12 is a drawing showing an example of the output adjusting circuit in the ninth example of the present invention. Hereupon, the whole or general configuration is similar to those of the first to sixth examples and has the same function. Therefore, those aforementioned explanations and notations can be applied also in this example. Therefore redundant overlapping description is avoided here.

In the present example, a pulse waveform generator 37 is provided in place of the pulse waveform generator 33 of the aforementioned seventh example. Hereupon, for those elements having the same functions with that in the seventh example, the same numerals are given and overlapping explanation thereon is omitted. In the present example, those respective setting signals from the period extension setting circuit 38, the lowering period setting circuit 34, the lowered current setting circuit 35, the pulse period setting circuit 17, the base current setting circuit 18, the peak current setting circuit 19 and also the output signal of the comparator 14 are all inputted into a pulse waveform generator 37.

Next, the action of this circuit is explained below. Hereupon, explanation on the action of those parts common with that of the above-mentioned seventh example are omitted. In case that a droplet detachment occurs and a signal to indicate the droplet detachment time being issued from the comparator 14 is present during the pulse period in the welding operation, the above-mentioned pulse waveform generator 37 issues to the output controller 32 a pulse signal of lowered level current waveform. The lowered level current pulse signal is such that, only with regard to those pulses in which the droplet detachment is detected, at least for a lowering time period $t_M$ counted from the point of time of droplet's detachment to the completion of transfer of the droplet into the weld pool, and that the pulse period is extended the lowering by an extension period $t_E$, that is for the total time period $t_M+t_E$, where the extension period $t_E$ is set by a period extension setting circuit 38, the current is reduced to a lowered level current $I_r$ set by the lowered current setting circuit 35, and the current $I_r$ is no higher than the peak current $I_p$.

As a result, the output current waveform becomes such that it has a level $I_p$ in the first half part of the pulse period and becomes a lower value $I_r$ in the time period $t_M$ after the droplet detachment detection. Thus, the arc force acting on the droplet after detachment is weakened, thereby enabling to prevent the spatter spray.

The lowering period $t_M$ is set by the lowering period setting circuit 34, and the extension period $t_E$ is set by the period extension setting circuit 38. If the output power of the welding is excessively reduced as a result of lowering of the current from $I_p$ to $I_r$ for the time period $T_M$, the output voltage adversely fluctuates, thereby inducing undesirable trouble such that the welding tip does not melt; and in worst case the arc will be extinguished. In order to make the welding voltage uniform by avoiding the possibility of breaking the arc, it is necessary to make the energy during the period wherein the current after the droplet detachment detection and the energy during the period wherein the pulse period is extended to be the same, and hence the extension period $t_E$ and the lowering period $t_M$ must be chosen so as to fulfill the relation shown by the following equation (1):

$$t_E = t_M(I_p - I_r)/(I_p - I_b). \tag{1}$$

Hereupon, in case of setting $I_r$ to $I_b$, from the equation (1), it becomes $t_E = I_M$.

Figure 13:
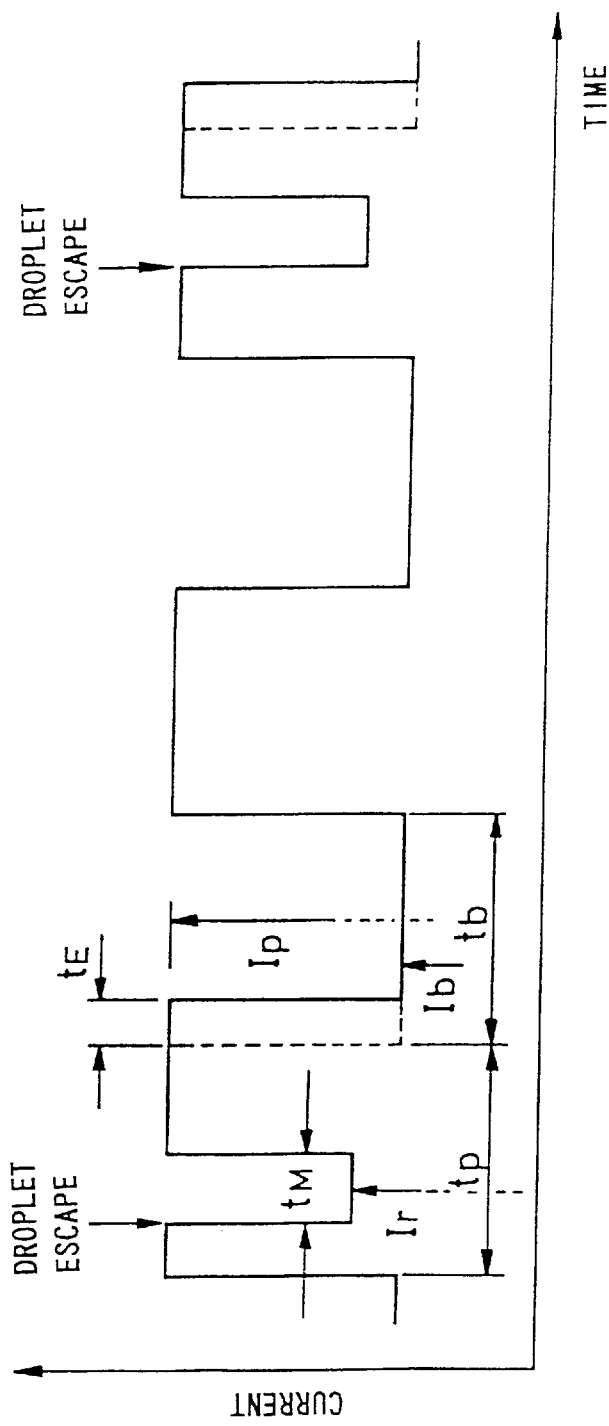
FIG. 13 is a schematic waveform chart showing one example of the welding current waveform in the Example 9 of the present invention.

FIG. 13 is a drawing showing an example of a welding current waveform obtained in the present example 9.

[EXAMPLE 10]

Figure 14:
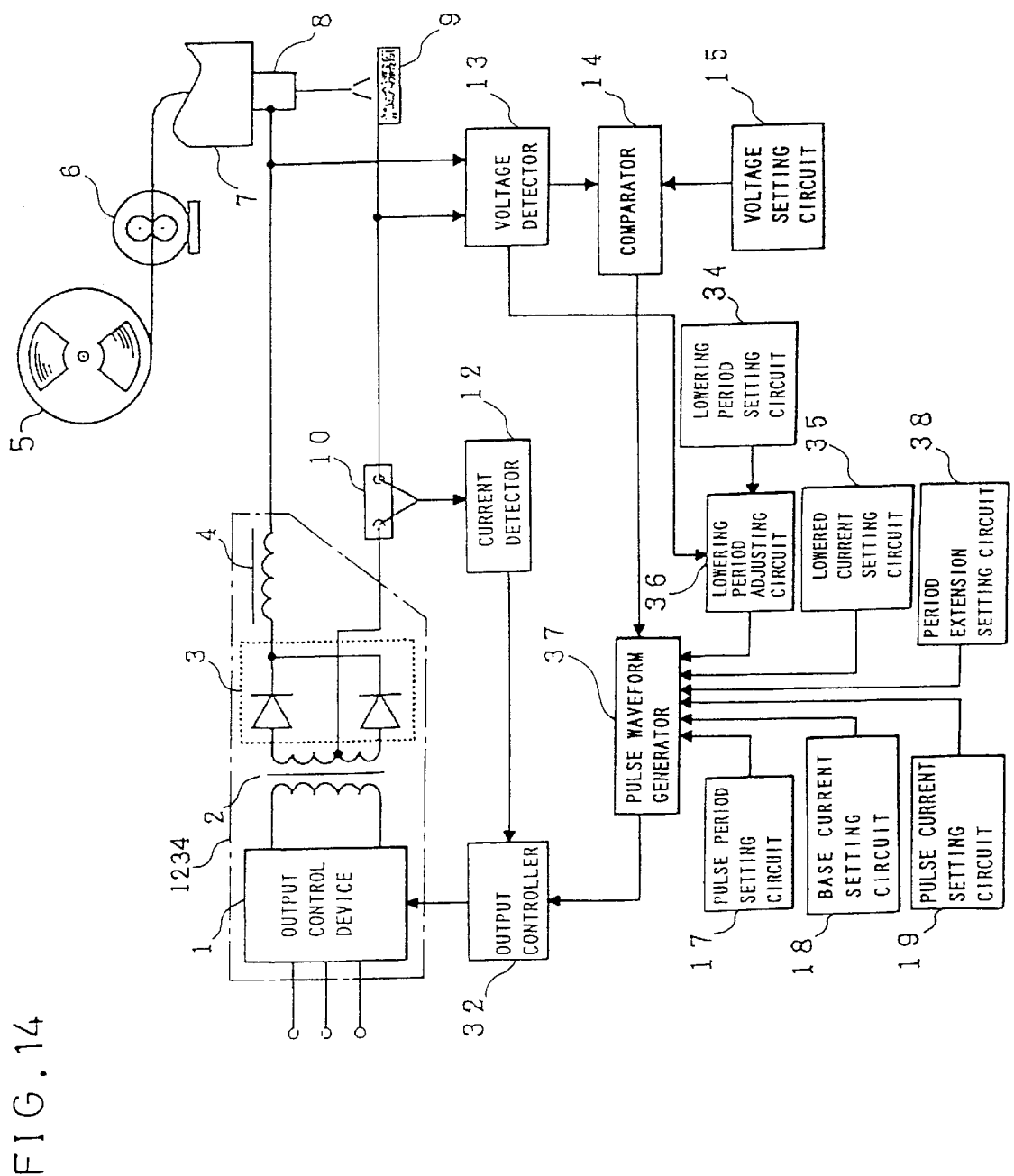
FIG. 14 is a block diagram showing the constitution of the output adjusting circuit of the output control apparatus of a consumable electrode type pulsed arc welder in accordance with an Example 10 of the present invention.

FIG. 14 is a drawing showing an example of an output adjusting circuit in a tenth example of the present invention. Hereupon, since the whole or general configuration is similar to those first to sixth examples and has the same function, those aforementioned explanations and notations can be applied also in this example. Therefore redundant overlapped description is avoided here.

In the present example, the lowering period setting circuit 34, which issues one of input signals inputted into the pulse waveform generator 37 of the above-mentioned example 9, is provided in place of the lowering period adjusting circuit 36 of the eighth example. Hereupon, for those elements having the same functions with that in the seventh example, the same numerals are given and overlapped explanation thereon is omitted.

Next, the action of the circuit is explained below. Hereupon, overlapped explanations on the actions of those common parts with those of the above-mentioned examples 8 and 9 are omitted. To the lowering period adjusting circuit 36, a feedback signal of the welding voltage from the voltage detector 13 and the setting signal of the lowering period setting circuit 34 are inputted. In the initial period of the welding operation after an arc started, the lowering period $t_M$ set by the above-mentioned lowering period setting circuit 34 is issued without any adjustment from the above-mentioned lowering period control circuit 36. By considering the transient period from starting of an arc to stabilization of the arc, the above-mentioned welding initial time period is set to be around 1 second.

During the welding operation, a time period $[t_M + \Delta t_M]$ obtained by adding a lowering adjustment period $\Delta t_M$, which is variable responding with the welding voltage value fed-back from the above-mentioned voltage detector 13, to the lowering period $t_M$ set by the above-mentioned lowering period setting circuit 34, that is, lowering period $t_M$+lowering adjustment period $\Delta t_M$, is issued from the above-mentioned lowering period adjusting circuit 36.

Therefore, in the case that, a signal to indicate the droplet detachment time being issued from the comparator 14 is present during the pulse period in the welding operation, the above-mentioned pulse waveform generator 37 issues to the output controller 32 the below-mentioned pulse signal of lowered level current and extension period waveform. The lowered level current pulse signal is such that, only with regard to those pulses in which the droplet detachment is detected, at least for a lowering time period $t_M$ counted from the point of time of droplet's detachment to the completion of transfer of the droplet into the weld pool, added with the lowering adjustment period $\Delta t_M$, that is for the total, time period $t_M + \Delta t_M$, the current is reduced to a lowered level current Ir set by the lowered time setting circuit 35, and the current Ir is no higher than the peak current Ip. The lowering adjustment period $\Delta t_M$ is set by the lowering period adjusting circuit 36. And the extension period $t_E$ set by the period extension setting circuit 38 can be derived from the equation (1) by using the lowering period $t_M$ set by the lowering period setting circuit 34.

[EXAMPLE 11]

Figure 15:
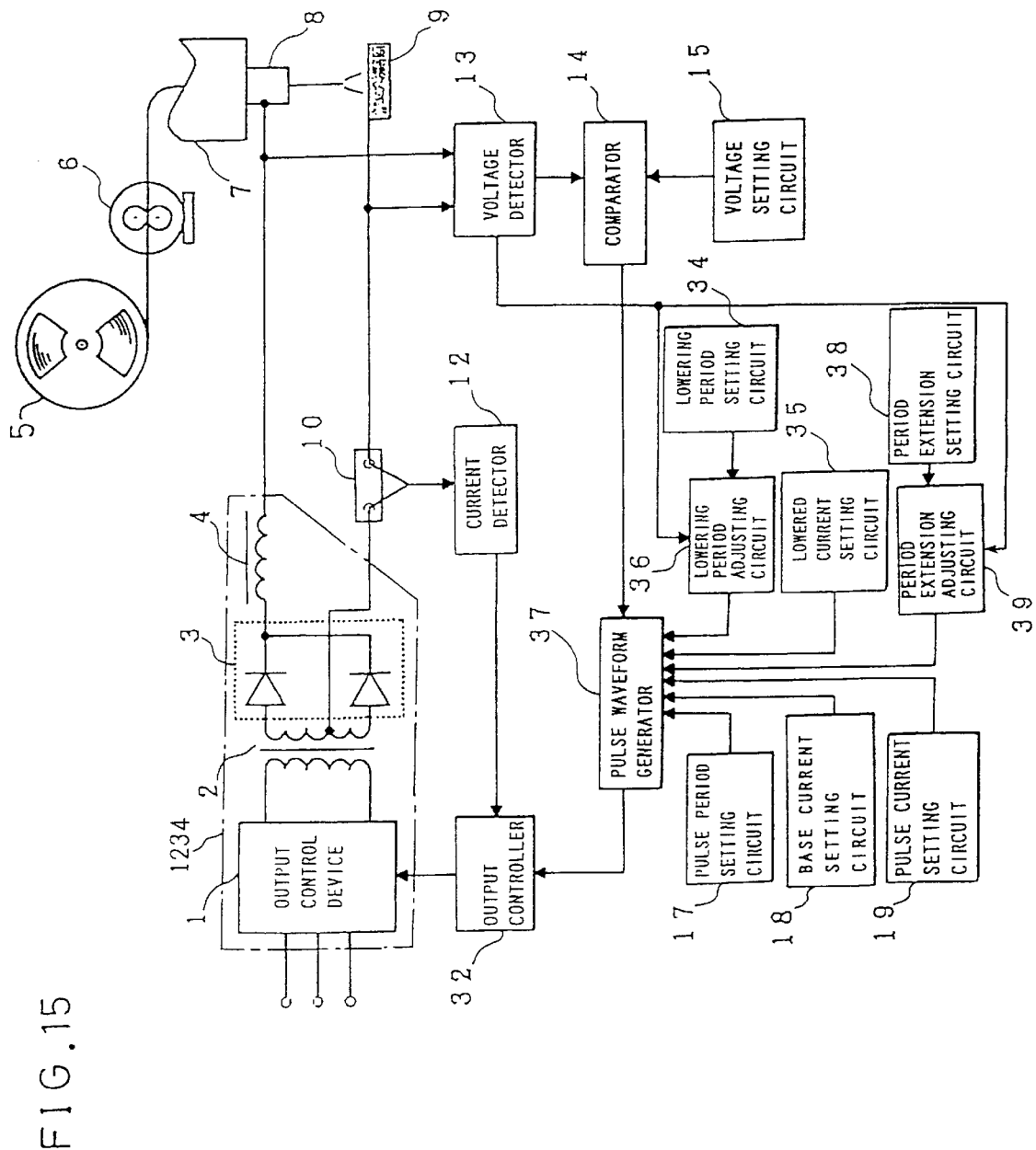
FIG. 15 is a block diagram showing the constitution of the output adjusting circuit of the output control apparatus of a consumable electrode type pulsed arc welder in accordance with an Example 11 of the present invention.

FIG. 15 is a drawing showing an example of the output adjusting circuit in the eleventh example of the present invention. Hereupon, since the whole or general configuration is similar to those of the first to sixth examples and has the same function, those aforementioned explanations and notations can be applied also in this example. Therefore, redundant overlapped description is avoided here. In the present example, the period extension setting circuit 38, which issues one of input signals inputted into the pulse waveform generator 37 of the above-mentioned tenth example, is replaced by a period extension adjusting circuit 39. Hereupon, for those elements having the same functions with that in the tenth example, the same numerals are given and explanation thereon is omitted. In the present example, the setting signal of the period extension setting circuit 38 and the output signal of the voltage detector 13 are inputted into the period extension adjusting circuit 39.

Next, the action of this circuit is explained below. Hereupon, explanation on the action of those parts common with that of the above-mentioned tenth example are omitted. To the period extension adjusting circuit 39, a feedback signal of the welding voltage from the voltage detector 13 and the setting signal of the period extension setting circuit 38 are inputted. In the initial period of the welding operation after an arc started, the extension period $t_E$ set by the above-mentioned period extension setting circuit 38 is issued without including any compensation through the above-mentioned period extension adjusting circuit 39. Here, considering the transient period after an arc started until the arc becomes stabilized, the above-mentioned welding initial time period is normally set to be around 1 second.

During the welding operation, a time period obtained by adding an extension adjusted period $\Delta t_E$, which is variable depending upon the welding voltage value fed-back from the above-mentioned voltage detector 13, to the extension period $t_E$ set by the above-mentioned period extension setting circuit 38, that is, extension period $t_E$+extension adjusted period $\Delta t_E$, is issued from the above-mentioned period extension adjusting circuit 39.

Therefore, in the case that, a signal to indicate the droplet detachment time being issued from the comparator 14 is present during the pulse period in the welding operation, the above-mentioned pulse waveform generator 37 issues to the output controller 32 a pulse signal of lowered level current waveform. The lowered level current pulse signal is such that, only with regard to those pulses in which the droplet detachment is detected, at least for a lowering time period $t_M$ counted from the point of time of droplet's detachment to the completion of transfer of the droplet into the weld pool, added with the lowering adjustment period $\Delta t_M$, that is for the total time period $t_M + \Delta t_M$, the current is reduced to a lowered level current $I_r$ set by the lowered current setting circuit 35; and the current $I_r$ is set by the lowered current setting circuit 35, and the current $I_r$ is no higher than the peak current $I_p$.

As a result, the output current waveform becomes such that it has a level $I_p$ in the first half part of the pulse period and becomes a lower value of $I_r$ in the time period $t_M + \Delta t_M$ after the droplet detachment detection. Thus, the arc force acting on the droplet after detachment is weakened to be able to prevent the spatter spray. This lowering period $t_M$+lowering adjusted period $\Delta t_M$ is set by the lowering period adjusting circuit 36. Whereas the extension period $t_E$+extension adjusted period $\Delta t_E$ can be set by the period extension adjusting circuit 39. And, from the relation between the extension period $t_E$ and the lowering period $t_M$ shown in the equation (1), a relation between the extension adjusted period $\Delta t_E$ and the lowering adjusted period $\Delta t_M$ can be obtained as shown in the following equation (2):

$$\Delta t_E = \Delta t_M (I_p - I_r)/(I_p - I_b). \qquad (2)$$

Hereupon, in case of setting $I_r$ to $I_b$, by the equation (2) it becomes $\Delta t_E = \Delta t_M$. The above-mentioned extension adjusted period $\Delta t_E$ differs responding with ranges of the initial setting voltage, and boundaries between ranges of the initial setting voltage is complicated. Because of such the reason, in the present invention, it is preferable to derive arithmetically the extension time period $t_E$+the extension adjusted period $\Delta t_E$ by the fuzzy inference operation.

Figure 16:
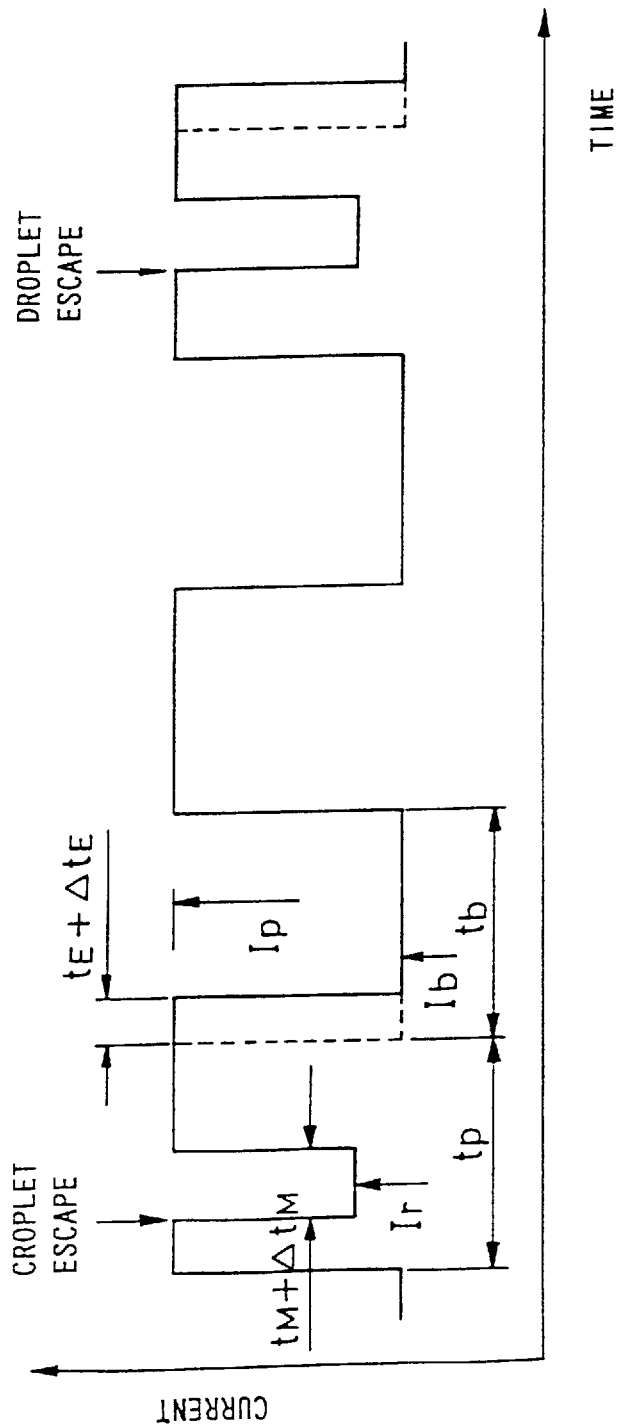
FIG. 16 is a schematic waveform chart showing one example of the welding current waveform in the Example 11 of the present invention.

FIG. 16 is a drawing showing one example of the welding current waveform obtained by the present example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. Apparatus for controlling consumable electrode type pulsed arc welding power source comprising:

a voltage detector for detecting the welding voltage, a comparator which performs a comparison arithmetic calculation between a detected voltage from said voltage detector and a reference voltage from a voltage setting circuit and issues a detection signal when said detected voltage exceeds said reference voltage, a lowering period setting circuit, a lowering current setting circuit, and a pulse waveform generator to which setting signals from the above-mentioned lowering period setting circuit, from the above-mentioned lowered current setting circuit, from a pulse period setting circuit, from a base current setting circuit, and from a peak current setting circuit, and also the detected signal of the above-mentioned comparator are inputted, and a pulse is issued so that the peak current level is lowered, with taking the detected signal from the above-mentioned comparator as a starting time point, to the level of a lowered current $I_r$ which is lower than a peak current $I_p$ and set by the lowered current setting circuit during a lowering period $t_m$ which was set by the above-mentioned lowering period setting circuit and lasts at least until a droplet is absorbed perfectly by a weld pool.

2. Apparatus for controlling consumable electrode type pulsed arc welding power source in accordance with claim 1 wherein said pulse generator is a pulse waveform generator which receives an output signal of a lowering period adjusting circuit having its inputs of a setting signal from the lowering period setting circuit and a detected voltage from the voltage detector, and those detected signals from the lowered current setting circuit, from the pulse period setting circuit, from the base current setting circuit, and from the peak current setting circuit, and also receives all the detected signal of the above-mentioned comparator are all inputted, and issues a pulse so that the peak current level is lowered, with taking the detected signal from the above-mentioned comparator as a starting time point, to the level of the lowered current $I_r$ which is lower than the peak current $I_p$ and set by the lowered current setting circuit during lowering period $t_m$+lowering adjusted period $\Delta t_m$, which was adjusted by a lowering period adjusting circuit and lasts at least until a droplet is absorbed perfectly by a weld pool.

3. Apparatus for controlling consumable electrode type pulsed arc welding power source in accordance with claim 2 wherein the lowering period adjusting circuit is a fuzzy inference operation circuit having its inputs of a setting signal from the lowering period setting circuit and a detected voltage from the voltage detector.

4. Apparatus for controlling consumable electrode type pulsed arc welding power source in accordance with claim 1 wherein said pulse waveform generator receives detected signals from the lowering period setting circuit, from a lowered current setting circuit, from a period extension setting circuit, from the pulse period setting circuit, from the base current setting circuit, and from the peak current setting circuit, and also the detected signal of the above-mentioned comparator, and issues a pulse so that the peak current level is lowered, with taking the detected signal from the above-mentioned comparator as a starting time point, to the level of the lowered current $I_r$ which is lower than the peak current $I_p$ and set by the lowered current setting circuit during a lowering period $t_M$ which was set by the above-mentioned lowering period setting circuit and lasts at least until a time point of occurrence of perfect transfer from the droplet to the weld pool, and the pulse period in which the droplet detachment is detected is extended by an extension period $t_E$ set by the above-mentioned period extension setting circuit.

5. Apparatus for controlling consumable electrode type pulsed arc welding power source in accordance with claim 1 wherein said pulse waveform generator receives an output signal of a lowering period adjusting circuit having its inputs of a setting signal from the lowering period setting circuit and of a detected voltage from the voltage detector, and those detected signals from the lowered current setting circuit, from the period extension setting circuit, from the pulse period setting circuit, from the base current setting circuit, and from the peak current setting circuit, and also receives the detected signal of the above-mentioned comparator are all inputted, and then issues a pulse so that the peak current level is lowered, with taking the detected signal from the above-mentioned comparator as a starting time point, to the level of the lowered current $I_r$ which is lower than the peak current and set by the lowered current setting circuit during lowering period $t_M$+lowering adjusted period $\Delta t_M$, which was adjusted by the above-mentioned lowering period adjusting circuit and lasts at least until a time point of occurrence of perfect transfer from the droplet to the weld pool and the pulse period in which the droplet detachment is detected is extended by an extension period $t_E$ set by the above-mentioned period extension setting circuit 6. Apparatus for controlling the consumable electrode type pulsed arc welding power source in accordance with claim 1 wherein said pulse waveform generator receives an output signal of a lowering period adjusting circuit having its inputs of a setting signal from the lowering period setting circuit and a detected signal from the voltage detector, and an output signal of an extension adjusting circuit having its inputs of a setting signal from the period extension setting circuit and of a detected voltage from the voltage detector, and those detected signals from the lowered current setting circuit, from the pulse period setting circuit, from the base current setting circuit, and from the peak current setting circuit, and also receives the detected signal of the above-mentioned comparator are all inputted, and then issues a pulse so that the peak current level is lowered, with taking the detected signal from the above-mentioned comparator as a starting time point, to the level of the lowered current $I_r$ which is lower than the peak current $I_p$ and set by the lowered current setting circuit during lowering period $t_M$+lowering adjusted period $\Delta t_M$, which was adjusted by the above-mentioned lowering period adjusting circuit and lasts at least until a time point of occurrence of perfect transfer from the droplet to the weld pool and the pulse period in which the droplet detachment is detected is extended by extension period $t_E$+extension adjusted period $\Delta t_E$ set by the above-mentioned extension adjusting circuit.

7. Apparatus for controlling consumable electrode type pulsed arc welding power source in accordance with claim 6 wherein the extension adjusting circuit is a fuzzy inference operation circuit having its inputs of a setting signal from the above-mentioned period extension setting circuit and a detected voltage from the voltage detector.

8. An apparatus for controlling a power source of a consumable electrode type pulsed arc welder, the power source outputting a welding voltage and a welding current, the apparatus comprising:

a voltage detector electrically coupled to the power source for detecting an instantaneous value of the welding voltage and for outputting a welding voltage signal representative of the detected instantaneous value;

a voltage setting circuit for outputting a reference signal;

a comparator electrically coupled to the voltage detector for receiving the welding voltage signal and electrically coupled to the voltage setting circuit for receiving the reference signal, the comparator for comparing the welding voltage signal and the reference signal and for outputting a detection signal when the welding voltage signal exceeds the reference signal; and an output adjustor for receiving the detection signal and for reducing the welding current from a higher level to a lower level upon such receipt;

wherein the comparator has:

input ports for receiving:

an output signal from an initial voltage memory, the initial voltage memory for memorizing a voltage value at a starting time of peak current conduction based on the welding voltage signal from the voltage detector;

the welding voltage signal from the voltage detector; and the reference signal from the voltage setting circuit; and an output port for issuing the detection signal when a difference between the welding voltage signal and the output signal from the initial voltage memory exceeds the reference signal.

9. The apparatus of claim 8 further comprising:

a differentiator for detecting a variation rate of the welding voltage signal and for outputting a variation signal representative of the detected variation rate; and a differential value setting circuit for outputting a differential set value signal;

wherein the comparator receives the variation signal and the differential set value signal and issues the detection signal when the variation signal exceeds the differential set value signal.

10. The apparatus of claim 9 further comprising:

a reference value setting circuit for outputting a reference set value signal;

a short-circuit detector for receiving the welding voltage signal and the reference set value signal, for discriminating a short-circuit and an arc based on a comparison of the welding voltage signal and the reference set value signal, and for outputting a short circuit signal upon discriminating such short circuit; and a period setting circuit for receiving the short circuit signal, for setting a voltage rising period at a time of transfer from short-circuit to arc based on such short circuit signal, and for outputting a corresponding period setting signal for receipt by the output adjustor;

wherein the output adjustor cancels the detection signal from the comparator when a time lapse is less than the voltage rising period.

11. The apparatus of claim 8 further comprising:

a resistance value operator for receiving the welding voltage signal from the voltage detector and a corresponding welding current signal from a current detector, for calculating a resistance value based on the welding voltage signal and the welding current signal, and for outputting a corresponding resistance signal; and a resistance value setting circuit for outputting a resistance set value signal;

wherein the comparator receives the resistance signal and the resistance set value signal and issues the detection signal when the resistance signal exceeds the resistance set value signal.

12. The apparatus of claim 8 further comprising:

a resistance value operator for receiving the welding voltage signal from the voltage detector and a corresponding welding current signal from a current detector, for calculating a resistance value based on the welding voltage signal and the welding current signal, and for outputting a corresponding resistance signal;

an initial resistance value memory for receiving the resistance signal, for memorizing a resistance value at the time pulse conduction starts, and for outputting a corresponding resistance memory signal; and a resistance value setting circuit for outputting a resistance set value signal;

wherein the comparator receives the resistance signal, the resistance memory signal, and the resistance set value signal and issues the detection signal when a difference between the resistance signal and the resistance memory signal exceeds the resistance set value signal.

13. The apparatus of claim 8 further comprising:

a resistance value operator for receiving the welding voltage signal from the voltage detector and a corresponding welding current signal from a current detector, for calculating a resistance value based on the welding voltage signal and the welding current signal, and for outputting a corresponding resistance signal;

a differentiator for receiving the resistance signal, for detecting a variation rate of the resistance signal and for outputting a resistance variation signal representative of the detected variation rate; and a differential value setting circuit for outputting a differential set value signal;

wherein the comparator receives the resistance variation signal and the differential set value signal and issues the detection signal when the variation signal exceeds the differential set value signal.

14. The apparatus of claim 13 further comprising:

a reference value setting circuit for outputting a reference set value signal;

a short-circuit detector for receiving the welding voltage signal and the reference set value signal, for discriminating a short-circuit and an arc based on a comparison of the welding voltage signal and the reference set value signal, and for outputting a short circuit signal upon discriminating such short circuit; and a period setting circuit for receiving the short circuit signal, for setting a voltage rising period at a time of transfer from short-circuit to arc based on such short circuit signal, and for outputting a corresponding period setting signal for receipt by the output adjustor;

wherein the output adjustor cancels the detection signal from the comparator when a time lapse is less than the voltage rising period.

* * * * *